(12) United States Patent
Ide et al.

(10) Patent No.: US 9,470,957 B2
(45) Date of Patent: Oct. 18, 2016

(54) OPTICAL DEVICE

(75) Inventors: Masafumi Ide, Tokorozawa (JP); Takaaki Nozaki, Iruma (JP); Kaoru Yoda, Nagano (JP); Yosuke Abe, Fuchu (JP)

(73) Assignee: CITIZEN HOLDINGS CO., LTD., Tokyo (JP)

( * ) Notice: Subject to any disclaimer, the term of this patent is extended or adjusted under 35 U.S.C. 154(b) by 0 days.

(21) Appl. No.: 14/119,853

(22) PCT Filed: May 22, 2012

(86) PCT No.: PCT/JP2012/063091
§ 371 (c)(1),
(2), (4) Date: Nov. 22, 2013

(87) PCT Pub. No.: WO2012/161199
PCT Pub. Date: Nov. 29, 2012

(65) Prior Publication Data
US 2014/0161387 A1    Jun. 12, 2014

(30) Foreign Application Priority Data

May 23, 2011 (JP) ................... 2011-114619
May 23, 2011 (JP) ................... 2011-114620

(51) Int. Cl.
*G02B 6/12* (2006.01)
*G02F 1/377* (2006.01)
*G02F 1/35* (2006.01)

(52) U.S. Cl.
CPC ............... *G02F 1/377* (2013.01); *G02B 6/12* (2013.01); *G02F 2001/3505* (2013.01); *G02F 2203/21* (2013.01)

(58) Field of Classification Search
CPC . G02B 6/12; G02F 1/377; G02F 2001/3505; G02F 2203/21

USPC .......................................................... 385/14
See application file for complete search history.

(56) References Cited

U.S. PATENT DOCUMENTS 3,653,645 A * 4/1972 Heian ................... F27B 7/2066
106/746
5,869,952 A * 2/1999 Fisher et al. ................... 320/136
(Continued)

FOREIGN PATENT DOCUMENTS

CN    101421652 A    4/2009
JP    H06-338650 A    12/1994
(Continued)

OTHER PUBLICATIONS

International Search Report for PCT/JP2012/063091, Jun. 26, 2012.
(Continued)

*Primary Examiner* — Peter Radkowski

(57) ABSTRACT

The invention is directed to the provision of an optical device in which provisions are made to form a gap between an optical waveguide and a substrate without having to form a groove or the like in the substrate and to prevent any stress from being applied to an optical element even when it is heated by a heater for temperature adjustment. More specifically, the invention provides an optical device includes a substrate, an optical element with an optical waveguide formed in a surface thereof that faces the substrate, bonding portions formed on the substrate at positions that oppose each other across the optical waveguide, a heater, formed on at least one of the optical element and the substrate, for heating the optical waveguide, and a micro bump structure formed from a metallic material, wherein the optical element is bonded to the bonding portions via the micro bump structure in such a manner that a gap is formed between the optical waveguide and the substrate.

8 Claims, 26 Drawing Sheets

(56) References Cited

U.S. PATENT DOCUMENTS

| | | | | |
|---|---|---|---|---|
| 8,288,850 | B2* | 10/2012 | Huang | B81B 7/0077 257/684 |
| 2001/0022878 | A1* | 9/2001 | Saida et al. | 385/27 |
| 2002/0048421 | A1* | 4/2002 | Miyazaki | 385/1 |
| 2006/0140637 | A1* | 6/2006 | Sakata et al. | 398/147 |
| 2008/0101746 | A1* | 5/2008 | Okada | G03B 17/00 385/14 |
| 2009/0008729 | A1* | 1/2009 | Yang | H01L 27/14618 257/432 |
| 2009/0279827 | A1 | 11/2009 | Sano et al. | |
| 2010/0193912 | A1* | 8/2010 | Speakman | 257/618 |
| 2011/0018113 | A1* | 1/2011 | Huang | B81B 7/0077 257/684 |
| 2012/0068609 | A1 | 3/2012 | Ide et al. | |
| 2012/0154690 | A1* | 6/2012 | Sasagawa et al. | 348/739 |

FOREIGN PATENT DOCUMENTS

| | | | | |
|---|---|---|---|---|
| JP | 2000-244048 A | | 9/2000 | |
| JP | 2000244048 A | * | 9/2000 | H01S 5/024 |
| JP | 2002-131712 A | | 5/2002 | |
| JP | 2002131712 A | * | 5/2002 | G02F 1/015 |
| JP | 2005242012 A | * | 9/2005 | G02F 1/313 |
| JP | 2006-184798 A | | 7/2006 | |
| JP | 2007-025583 A | | 2/2007 | |
| JP | 2007025583 A | * | 2/2007 | |
| JP | 2009-522595 A | | 6/2009 | |
| WO | 2007/075175 A1 | | 7/2007 | |
| WO | 2010/137661 A1 | | 12/2010 | |

OTHER PUBLICATIONS

State Intellectual Property Office of the People'S Republic of China, Office Action for Chinese patent application No. 201280024954.5, Sep. 2, 2015.

Japan Patent Office, Office Action for Japanese Patent Application No. 2013-516386, Nov. 10, 2015.

* cited by examiner

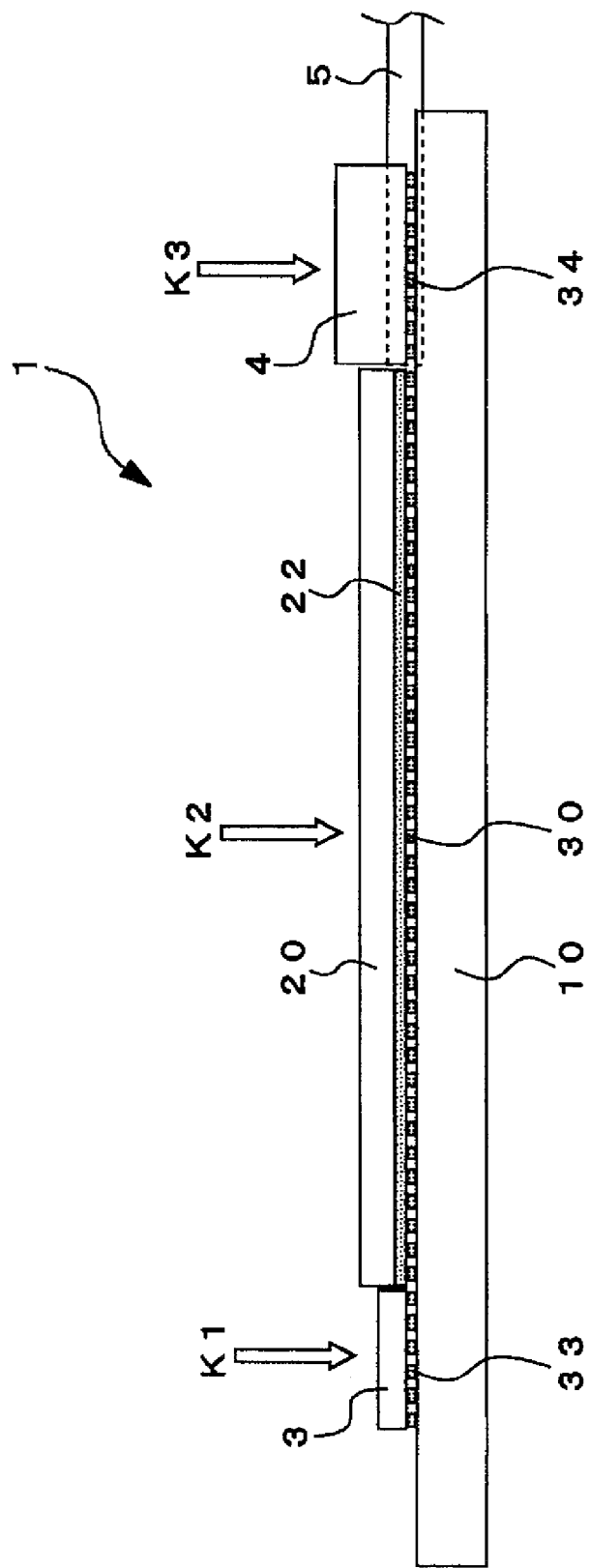

td: 0
P=0

$0 < td < T/2$
$P = V^2/R \times 2td/T$ td: T/2
$P = V^2/R$

OPTICAL DEVICE

TECHNICAL FIELD

The present invention relates to an optical device constructed by bonding an optical element with an optical waveguide formed therein to a substrate.

BACKGROUND

Short-wavelength laser light sources have been commercially implemented in a wide variety of applications ranging from laser projectors to high-density optical storage devices. The short-wavelength laser light source outputs laser light in blue, green, or other color by using a wavelength conversion element which converts infrared light, i.e., light at the fundamental wavelength that a laser device as an optical device produces, into light at the second harmonic of that wavelength. The wavelength conversion element is formed using a crystal material such as LN (lithium niobate: LiNbO3) or LT (lithium tantalate: LiTaO3), but the harmonic wavelength conversion efficiency of such crystal material has temperature dependence, and hence the property that the conversion efficiency greatly varies due to variations in ambient temperature.

FIG. 26(a) is a graph showing one example of the variation of the harmonic output (HFO) of a wavelength conversion element as a function of the ambient temperature (T) of the wavelength conversion element. As can be seen from the graph shown in FIG. 26(a), the output of the wavelength conversion element drops in regions where the ambient temperature is low, and the output also drops in regions where the ambient temperature is high. Since the harmonic output of the wavelength conversion element greatly varies due to temperature variations as depicted, a temperature characteristic correcting means for correcting the temperature characteristics of the wavelength conversion element is indispensable in order to achieve good conversion efficiency and to obtain stable laser light at the harmonic wavelength. It is known to provide a laser light source having a wavelength conversion element mounted with a heater in order to adjust the temperature of the wavelength conversion element to a desired value (for example, refer to patent document 1).

FIG. 26(b) is a diagram showing a short-wavelength laser light source disclosed in patent document 1. As shown in FIG. 26(b), the short-wavelength laser light source is constructed by mounting a 0.8-µm semiconductor laser 410 and a wavelength conversion element 420 on a silicon substrate 401. A fundamental wave 412 is output from an active layer 411 in the semiconductor laser 410, and is introduced into an optical waveguide 421 formed within the wavelength conversion element 420 which outputs blue laser light 430 at the second harmonic wavelength. A groove 402 is formed by etching in a portion of the surface at which the silicon substrate 401 contacts the wavelength conversion element 420.

A thin-film heater 422 constructed from a Ti film is formed on the lower surface of the wavelength conversion element 420, that is, near the optical waveguide 421. By energizing this thin-film heater 422, the wavelength conversion element 420 can be maintained at the desired temperature. Further, since the presence of the groove 402 in the silicon substrate 401 serves to prevent the thin-film heater 422 from contacting the silicon substrate 401, the heat from the thin-film heater 422 is not easily conducted to the silicon substrate 401.

In a semiconductor laser device having temperature-dependent output characteristics, it is also known to provide a strip-like heater near the optical waveguide in order to reduce power consumption (for example, refer to patent document 2).

PRIOR ART DOCUMENTS

Patent Documents

Patent document 1: Japanese Unexamined Patent Publication No. H06-338650 (page 5, FIG. 5)
Patent document 2: Japanese Unexamined Patent Publication No. 2000-244048 (page 3, FIGS. 1 and 2)

SUMMARY

In the structure disclosed in patent document 1, the groove 402 is formed by etching or the like in the silicon substrate 401 in order to thermally insulate the silicon substrate 401 from the optical waveguide 421. This requires the provision of an additional step for etching the silicon substrate 401, resulting in increased complexity of the fabrication process.

Further, when the thin-film heater 422 is repeatedly energized and deenergized to adjust the temperature of the wavelength conversion element 420, the layer of air 403 trapped inside the groove 402 of the silicon substrate 401 is repeatedly heated and cooled. The air layer 403 is thus caused to expand and contract repeatedly, but since there is no passage for venting the air trapped in the air layer 403 to the outside of the silicon substrate 403, the air layer 403 is repeatedly subjected to pressure variations.

As a result, a stress is applied to the wavelength conversion element 420 as the pressure varies in the air layer 403, and the strain thus caused to the wavelength conversion element 420 eventually leads to such deficiencies as the degradation of the wavelength conversion characteristics and the output degradation of the laser light 430 due to misalignment between the wavelength conversion element 420 and the semiconductor laser 410. In particular, if the stress is repeatedly and continually applied to the wavelength conversion element, the amount of misalignment increases with the elapse of the operating time, and the output of the laser light degrades over time, resulting in a serious reliability problem.

An object of the invention is to provide an optical device that is designed to solve the above problem.

Another object of the invention is to provide an optical device in which provisions are made to form a gap between the optical waveguide and the substrate without having to form a groove or the like in the substrate and to prevent any stress from being applied to the optical element even when it is heated by a heater for temperature adjustment.

A further object of the invention is to provide an optical device having excellent reliability by preventing dust or dirt from adhering to the optical waveguide.

A still further object of the invention is to provide an optical device that allows selective temperature control of the optical waveguide to be performed efficiently.

According to the invention, there is provided an optical device includes a substrate, an optical element with an optical waveguide formed in a surface thereof that faces the substrate, bonding portions formed on the substrate at positions that oppose each other across the optical waveguide, a heater, formed on at least one of the optical element and the substrate, for heating the optical waveguide, and a micro bump structure formed from a metallic material, wherein the optical element is bonded to the bonding portions via the micro bump structure in such a manner that a gap is formed between the optical waveguide and the substrate.

Preferably, in the optical device, the micro bump structure contains interstices that allow air to be drawn in and out the gap formed between the optical waveguide and the substrate.

Preferably, in the optical device, the heater is formed on the surface of the optical element that faces the substrate.

Preferably, in the optical device, the micro bump structure is made of Au and formed on the bonding portions, and the optical element includes an Au film for bonding to the micro bump structure.

Preferably, in the optical device, the micro bump structure is constructed from cylindrically shaped protrusions, each with a height of 1 to 5 μm and with a diameter of 2 to 10 μm, that are arranged at a pitch of 5 to 30 μm.

Preferably, in the optical device, the heater is formed from an ITO film or an InTiO film.

Preferably, in the optical device, the heater is formed in the shape of a strip extending along a longitudinal direction of the optical waveguide, and the optical device further includes lead portions provided at predetermined spaced intervals along the longitudinal direction of the heater in order to apply a voltage to the heater.

Preferably, in the optical device, each of the lead portions has a connecting portion whose width increases with increasing distance from the heater.

Preferably, the optical device further comprises voltage applying means for applying a voltage according to a pulse width modulation method to the lead portions.

In the optical device, the optical element is bonded to the substrate by the micro bump structure formed from a metallic material. Since the micro bump structure serves to secure a gap between the optical waveguide formed within the optical element and the substrate even when the optical element is bonded to the substrate by placing the optical element with its surface containing the optical waveguide facing (that is, face down on) the substrate, there is no need to form a groove or the like in the substrate, and the fabrication process of the substrate can be simplified.

In the optical device, the optical element is bonded to the substrate by the bonding portions having a micro bump structure. Since the interstices contained in the micro bump structure provide flow passages for the air layer surrounding the optical waveguide, the optical element can be prevented from being subjected to a stress by suppressing the pressure changes that can occur in the air layer due to the heating by the heater. This serves to prevent the optical element from being strained due to pressure changes in the air layer and hence to solve problems such as the degradation of the wavelength conversion characteristics and the degradation of the output light due to misalignment of the optical element.

In the optical device, since the micro bump structure contains a large number of very thin, narrow, and substantially two-dimensional interstices, if air is passed through the interstices, any foreign matter such as dust or dirt cannot pass through the micro bump structure, thus preventing dust or dirt from adhering to the surrounding area of the optical waveguide. Accordingly, an optical device having excellent reliability and capable of exhibiting stable characteristics over an extended period of time can be achieved by preventing the variations in the characteristics of the optical element caused by the effects of the adhering dust, etc.

When the heater for adjusting the temperature of the optical element in the optical device is formed from an ITO film or an InTiO film, since the ITO film or InTiO film is transparent the heater can be placed in close proximity to the optical waveguide of the optical element without adversely affecting the characteristics of the optical waveguide, and hence the temperature characteristics of the optical element can be corrected efficiently and highly accurately.

The optical device may include at least three lead portions provided at predetermined spaced intervals in order to apply voltage to the heater formed in the shape of a strip along the longitudinal direction of the optical waveguide. In this case, the heater is divided into a prescribed number of areas of resistors R, and the lead portions are connected to both ends of each resistor R; then, by controlling the Joule heat generated due to the current flowing through each individual resistor R of the heater by the voltage applied across the pair of lead portions, it becomes possible to selectively control the temperature of the waveguide by the heater.

The optical device may be configured to apply a phase-shifted square wave to each control voltage terminal by pulse-width modulation control of the current to be supplied to the heater. In this case, compared with analog (peak value) control, precise temperature control by digital control can be achieved using simple digital circuitry.

BRIEF DESCRIPTION OF THE DRAWINGS

FIG. 5 is a diagram for explaining how the alignment in height direction is adjusted using the micro bumps.

DESCRIPTION

An optical device will be described below with reference to drawings by taking as an example the case where the optical device is equipped with a wavelength conversion element that converts incident light into its second harmonic. It should, however, be understood that the present invention is not limited to the drawings, nor is it limited to any particular embodiment described herein.

Figure 1:
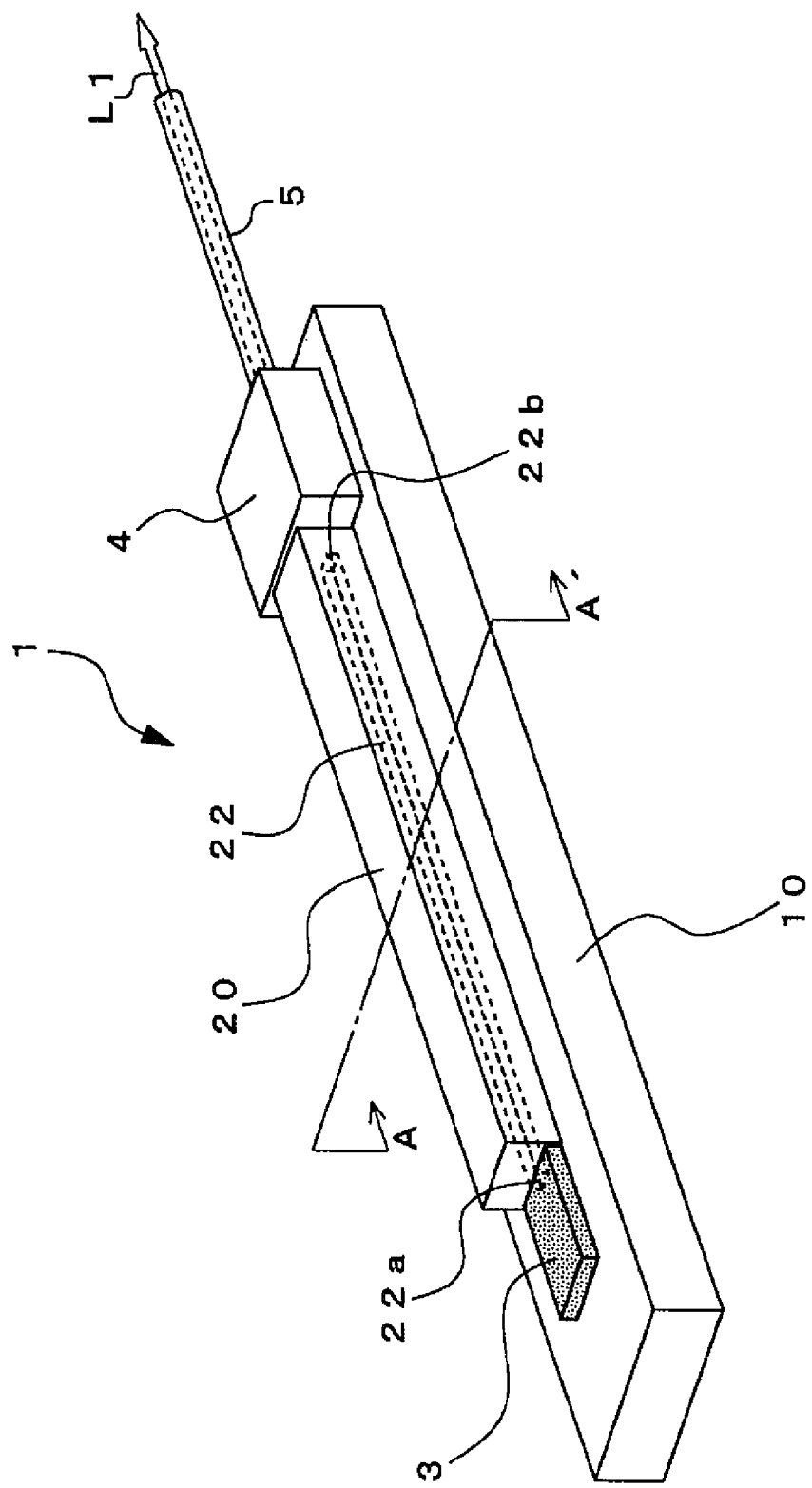
FIG. 1 is a diagram schematically showing the overall construction of an optical device 1.

FIG. 1 is a diagram schematically showing the overall construction of an optical device 1.

As shown in FIG. 1, the optical device 1 comprises a plate-like silicon substrate 10, a wavelength conversion element 20 as an optical element bonded to the silicon substrate 10, a semiconductor laser 3, bonded to the silicon substrate 10, for emitting laser light, and a sub-substrate 4, bonded to the silicon substrate 10, for fixedly holding an optical fiber 5. The optical device 1 is equipped with a ridge-type wavelength conversion element as the optical element, and a heater as a temperature characteristic correcting means for adjusting the temperature of the wavelength conversion element is formed by depositing an ITO film over the entire lower surface of the wavelength conversion element.

The semiconductor laser 3 emits infrared light at its fundamental wavelength (not shown) when a drive voltage is supplied from the silicon substrate 10 by a means not shown. The infrared light emitted from the semiconductor laser 3 is introduced through an entrance face 22a into an optical waveguide 22 (indicated by dashed lines) formed within the wavelength conversion element 20; the infrared light is then converted into its harmonic as it is passed through the optical waveguide 22, and emerges from an exit face 22b of the optical waveguide 22 as a green or blue laser light L1 which is then introduced into the optical fiber 5. The laser light L1 introduced into the optical fiber 5 is transmitted to an external optical system not shown by propagating through the optical fiber 5.

In one example, the semiconductor laser 3 emits infrared light of wavelength 1064 nm, and the wavelength conversion element 20 converts it into green laser light having a wavelength of 532 nm. In another example, the semiconductor laser 3 emits infrared light of wavelength 860 nm, and the wavelength conversion element 20 converts it into blue laser light having a wavelength of 430 nm. In either example, the optical device 1 can be used as a light source for a compact projector or the like that uses laser light as the light source. It is to be understood that the external view of the optical device 1 shown in FIG. 1 will also apply to other optical devices 100 and 110 to be described later.

Figure 2:
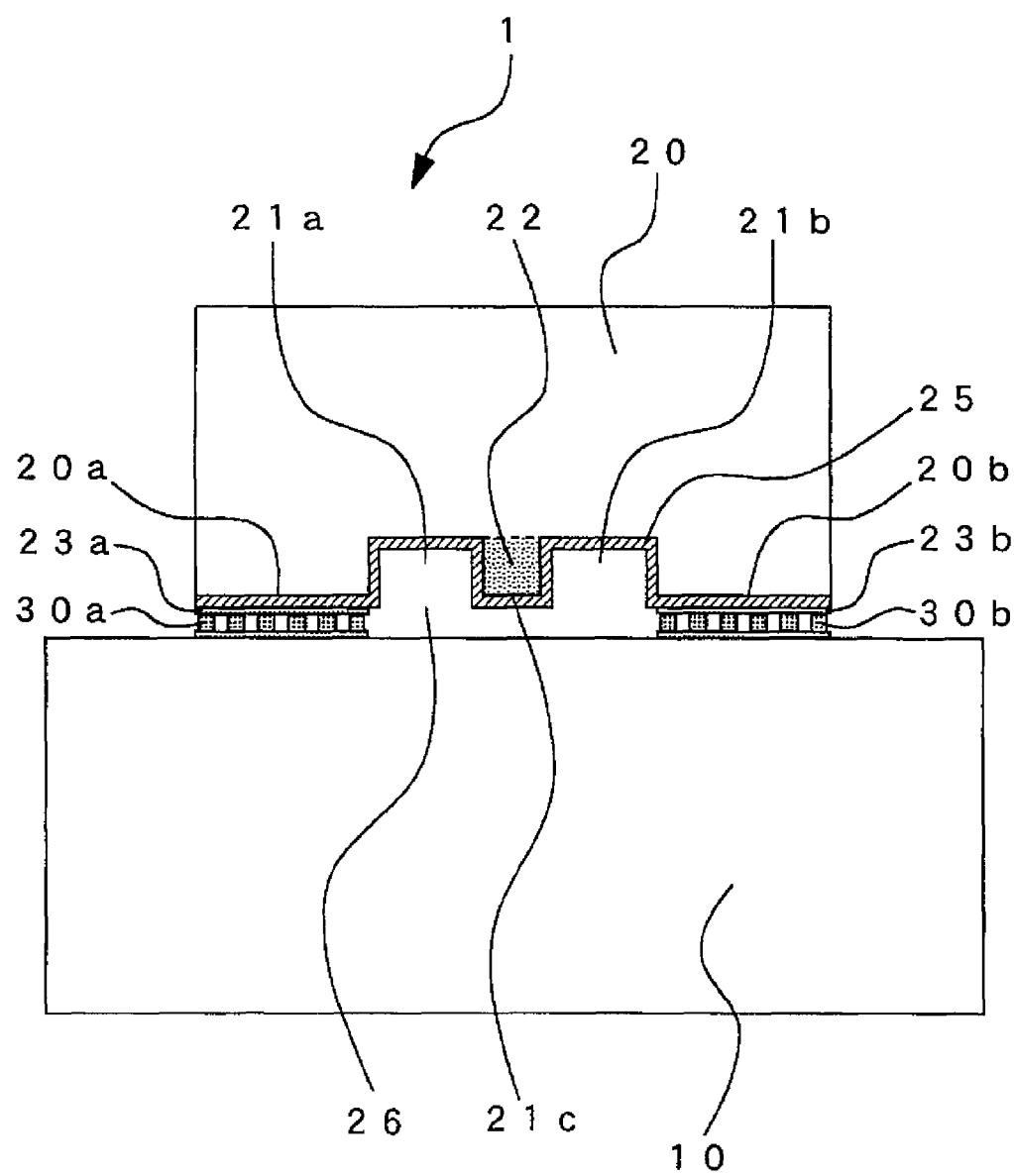
FIG. 2 is a cross-sectional view of the optical device 1 taken along line AA' in FIG. 1.

FIG. 2 is a cross-sectional view of the optical device 1 taken along line AA' in FIG. 1.

The wavelength conversion element 20 incorporated in the optical device 1 is a wavelength conversion element of a ridge-type structure formed from an SHG crystal composed principally of lithium niobate (LiNbO3). Two recessed portions 21a and 21b are formed in the lower surface of the optical waveguide 20 so as to extend along the longitudinal direction of the optical waveguide 20, and the optical waveguide 22 is formed in a raised portion 21c defined between the recessed portions 21a and 21b. That is, the optical waveguide 22 is formed in the lower surface facing the silicon substrate 10 in such a manner as to longitudinally extend substantially along the center axis of the wavelength conversion element 20.

As earlier described, the optical waveguide 22 has the function of receiving the laser light of the fundamental wavelength from the semiconductor laser 3 (see FIG. 1) and converting the received light into its harmonic for output. The entire lower surface of the wavelength conversion element 20 is covered with a thin indium oxide film 25 (hereinafter abbreviated as the ITO film 25). The ITO film 25 is formed over the entire lower surface, including the surfaces of the recessed portions 21a and 21b and the raised portion 21c, that faces the silicon substrate 10. The ITO film 25 functions as the heater for heating the optical waveguide 22, that is, as the temperature characteristic correcting means of the wavelength conversion element 20.

Au films 23a and 23b are formed on left and right planar portions 20a and 20b, respectively, of the lower surface of the wavelength conversion element 20, as viewed in the figure. The Au films 23a and 23b are formed by deposition on the surface portions of the ITO film 25 formed on the planar portions 20a and 20b.

Micro bumps 30a and 30b of Au having a prescribed thickness and having excellent electrical and thermal conductivity are formed as first and second bonding portions, respectively, on the upper surface of the silicon substrate 10 at positions that oppose each other across the optical waveguide 22 and that face the planar portions 20a and 20b of the wavelength conversion element 20.

By aligning the micro bumps 30a and 30b on the silicon substrate 10 with the Au films 23a and 23b formed on the lower surface of the wavelength conversion element 20 and by pressing them together, the silicon substrate 10 and the wavelength conversion element 20 can be bonded together by surface activation at normal temperature. That is, the wavelength conversion element 20 is mounted on the silicon substrate 10 by placing the optical waveguide 22 so as to face (that is, face down on) the silicon substrate 10 and so as to be positioned in close proximity to the silicon substrate 10. Since the micro bumps 30a and 30b are formed from Au having excellent electrical and thermal conductivity, the wavelength conversion element 20 and the silicon substrate 10 are mechanically, electrically, and thermally bonded together in a reliable manner by the micro bumps 30a and 30b.

A gap 26 as an air layer is formed between the wavelength conversion element 20 and the silicon substrate 10. The gap 26 serves to prevent the optical waveguide 22 formed in the lower surface of the wavelength conversion element 20 from coming into contact with the silicon substrate 10. The left and right sides and the underside of the optical waveguide 22 are covered with the air layer forming the gap 26. That is, because of the presence of the gap 26, the three sides, i.e., the left and right sides and the underside, of the optical waveguide 22 are contacted with the air layer, and light can be confined within the optical waveguide 22 by utilizing the refractive index difference between the air layer and the optical waveguide 22.

The left and right sides and the underside of the optical waveguide 22 are covered with the ITO film 25, but since the ITO film 25 is thin and transparent, the presence of the ITO film 25 has little effect on the characteristics of the optical waveguide 22.

The reason that the gap 26 can be formed between the wavelength conversion element 20 and the silicon substrate 10 is that the wavelength conversion element 20 and the silicon substrate 10 are bonded together by the micro bumps 30a and 30b having a prescribed thickness. That is, the wavelength conversion element 20 is bonded to the silicon substrate 10, one separated from the other by a distance equal to the thickness of the micro bumps 30a and 30b. Thus, the micro bumps 30a and 30b of the prescribed thickness not only have the function of mechanically, electrically, and thermally bonding the wavelength conversion element 20 to the first silicon substrate 10 but also have the function of maintaining the gap 26 for forming the air layer around the optical waveguide 22.

When a given current is supplied from the silicon substrate 10 by a means not shown to the ITO film 25 via the micro bumps 30a and 30b, the temperature of the ITO film 25 rises because of its inherent electrical resistance. In this way, the optical waveguide 22 covered with the ITO film 25 can be heated efficiently. Since the ITO film 25 is a pattern blanket-deposited over the entire lower surface of the wavelength conversion element 20, the entire structure of the optical waveguide 22 can be heated uniformly and evenly, and the optical waveguide 22 can produce a stable laser light output, irrespective of variations in ambient temperature.

The reason that the ITO film 25 can be formed in close proximity to the optical waveguide 22 is that the ITO film 25 is transparent. That is, when aligning the semiconductor laser 3 with the center of the wavelength conversion element 20, if the laser light strikes the ITO film 25 that functions as the heater, the ITO film 25 will not be heated and burnt by the laser light. Accordingly, the ITO film 25 as the heater can be formed in contacting relationship with the optical waveguide 22, so that the temperature can be adjusted by efficiently heating the optical waveguide 22.

As shown in FIG. 2, the optical device 1 employs a structure in which the micro bumps 30a and 30b are formed in a symmetrical manner at the left and right by interposing the optical waveguide 22 of the wavelength conversion element 20 therebetween, and no micro bumps are formed near or directly below the optical waveguide 22. This structure is employed for the following three reasons.

First reason: The optical waveguide 22 of the wavelength conversion element 20 confines the light by utilizing the refractive index difference between the optical waveguide 22 and its surrounding area (air layer). However, if any metal structure such as micro bumps were formed in direct contact with the optical waveguide 22, the refractive index difference relative to the surrounding area would change, and the optical waveguide 22 would become unable to confine the light as designed, resulting in degradation of the performance of the optical waveguide 22.

Second reason: When bonding the wavelength conversion element 20 to the silicon substrate 10 via the Au micro bumps by surface activation at normal temperature, a large pressure (as an example, 5 to 10 kgf/mm$^2$) must be applied to the silicon substrate 10 and the wavelength conversion element 20. However, if the micro bumps were present directly below the optical waveguide 22, a stress would be applied to the optical waveguide 22 via the micro bumps at the time of pressure application, and as a result, the crystal of the optical waveguide 22 would suffer deformation, and the wavelength conversion efficiency of the optical waveguide 22 would degrade.

Third reason: If, of the infrared light rays emitted from the semiconductor laser 3, the light rays that are not coupled into the optical waveguide 22 strike the micro bumps formed near or directly below the optical waveguide 22, heat is generated in these micro bumps. If the heat were transmitted to the optical waveguide 22, the temperature distribution within the optical waveguide 22 would change, which could degrade the conversion efficiency of the wavelength conversion element 20. In this way, if the micro bumps of metallic material were formed near or directly below the optical waveguide 22 of the wavelength conversion element 20, the optical waveguide 22 would be adversely affected by more than one factor, and the performance of the wavelength conversion element 20 would degrade.

For the above three reasons, in the optical device 1, the micro bumps 30a and 30b are not formed near or directly below the optical waveguide 22, but are formed in regions other than the region directly below the optical waveguide 22. Accordingly, in the optical device 1, since the micro bumps do not to directly contact the optical waveguide 22, the refractive index difference between the optical waveguide 22 and its surrounding area does not change, and the light can be confined as designed; that is, the performance of the optical waveguide 22 does not degrade.

Further, if a large pressure is applied to bond the wavelength conversion element 20 to the silicon substrate 10 by surface activation at normal temperature, since no micro bumps are present directly below the optical waveguide 22, no stress is applied to the optical waveguide 22, and therefore, there is no concern that the wavelength conversion efficiency may degrade. The micro bumps are not formed near or directly below the optical waveguide 22, but are formed in regions at some distance away from the optical waveguide 22. Accordingly, if some of the infrared light rays emitted from the semiconductor laser 3 are not coupled into the optical waveguide 22, such laser light does not strike the micro bumps and therefore does not adversely affect the wavelength conversion element 20.

Figure 3:
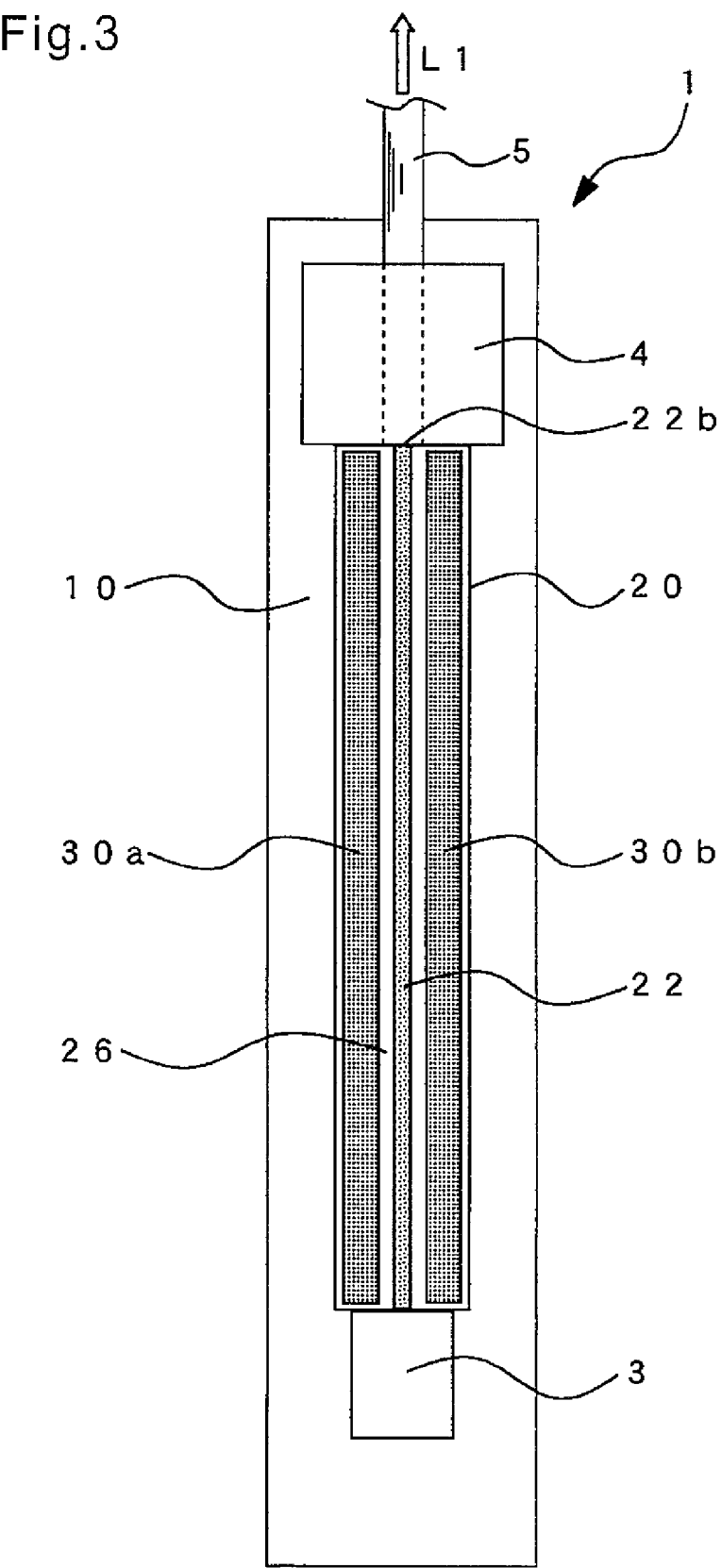
FIG. 3 is a top plan view of the optical device 1 shown in FIG. 1.

FIG. 3 is a top plan view of the optical device 1 shown in FIG. 1.

In FIG. 3, the wavelength conversion element 20 is shown in a cutaway view to reveal its internal structure for ease of understanding. The optical waveguide 22 is formed as a long narrow strip substantially centered in the wavelength conversion element 20 and extending along the longitudinal direction thereof, and the micro bumps 30a as the first bonding portion and the micro bumps 30b as the second bonding portion are arranged along the longitudinal direction of the wavelength conversion element 20 in such a manner as to flank the optical waveguide 22 on both sides. The micro bumps 30a and 30b, each about 4 µm in diameter and about 2.5 µm in height, for example, are arranged at a pitch of 10 µm or 25 µm in a symmetrical manner at the left and right of the optical waveguide 22. Preferably, the bump diameter is in the range of 2 to 10 µm, the bump height is in the range of 1 to 5 µm, and the bump pitch is in the range of 5 to 30 µm.

With this structure, since most of the surface portions of the wavelength conversion element 20 that contact the silicon substrate 10 are bonded by the two bonding portions forming the micro bumps 30a and 30b, as illustrated, the wavelength conversion element 20 and the silicon substrate 10 are securely bonded together.

The gap 26 created by the micro bump structure so as to surround the optical waveguide 22 at the left and right side as well as the underside thereof is formed so as to cover the entire region extending in the longitudinal direction of the optical waveguide 22 (see FIG. 1 for the gap 26 created at the underside of the optical waveguide 22). With this structure, light can be confined along the entire region extending in the longitudinal direction of the optical waveguide 22 by utilizing the refractive index difference between the optical waveguide 22 and the air layer forming the gap 26, and the infrared light emitted from the semiconductor laser 3 can be wavelength-converted by the optical waveguide 22 into the laser light L1 which is output from the exit face 22b and introduced into the optical fiber 5.

Figure 4A:
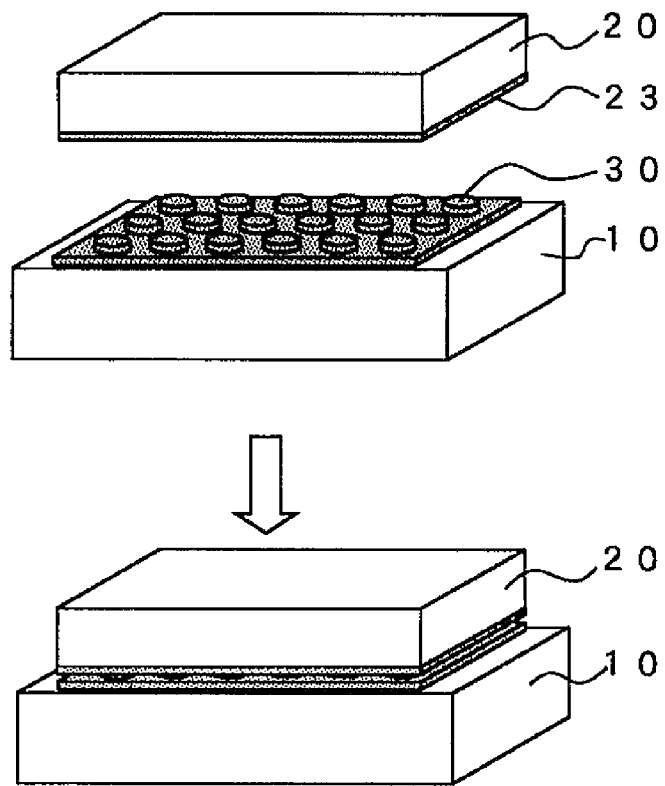
FIG. 4(a) is a schematic perspective view for explaining how a silicon substrate 10 and a wavelength conversion element 20 are bonded together by micro bumps.
Figure 4B:
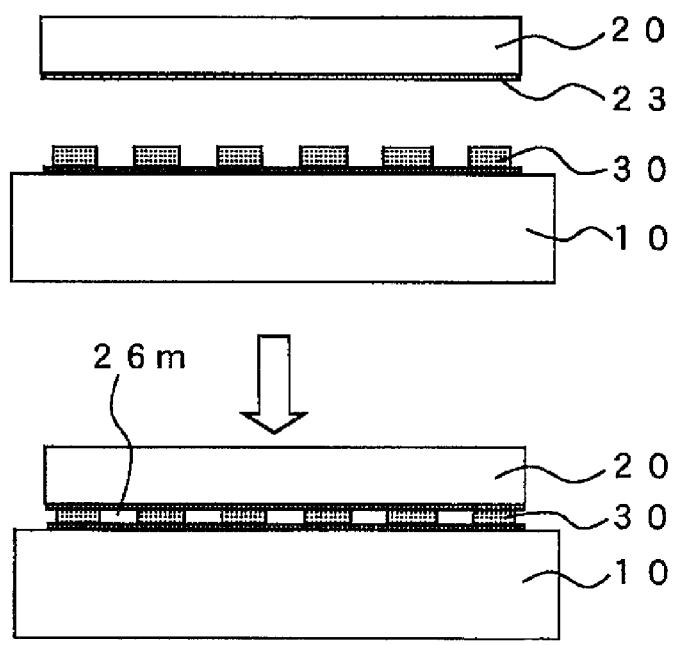
FIG. 4(b) is a schematic side view for explaining how the silicon substrate 10 and the wavelength conversion element 20 are bonded together by the micro bumps.

FIG. 4 is a diagram for explaining the method of micro bump bonding. FIG. 4(a) is a schematic perspective view for explaining how the silicon substrate 10 and the wavelength conversion element 20 are bonded together by the micro bumps. FIG. 4(b) is a schematic side view for explaining how the silicon substrate 10 and the wavelength conversion element 20 are bonded together by the micro bumps.

As shown in FIGS. 4(a) and 4(b), a large number of cylindrically shaped micro bumps 30 of Au are formed on an Au film on the upper surface of the silicon substrate 10. On the other hand, an Au film 23 is formed on the lower surface of the wavelength conversion element 20, that is, the surface to be bonded to the silicon substrate 10. Next, the surface of the micro bumps 30 and the surface of the Au film 23 are activated. Then, the wavelength conversion element 20 is placed on the silicon substrate 10 and pressed together; thereupon, the wavelength conversion element 20 is bonded to the silicon substrate 10 at normal temperature with the micro bumps 30 being slightly deformed in the thickness direction according to the applied load (normal temperature activated bonding). Here, the normal temperature activated bonding can be done because Au is activated.

Since the bonding by the Au micro bumps does not require heating, the fabrication process can be simplified. Furthermore, since there is no concern that a misalignment may occur between the silicon substrate 10 and the wavelength conversion element 20 due to heating, the silicon substrate 10 and the wavelength conversion element 20 can be bonded together while maintaining their proper positional relationship highly accurately. Moreover, since the Au micro bumps 30 have a thermal conductivity of about 320 W/(m·K), and thus conducts heat very well, the heat from the wavelength conversion element 20 can be transferred to the silicon substrate 10 efficiently. Accordingly, the silicon substrate 10 can serve as a heat sink for the wavelength conversion element 20.

The individual micro bumps 30 are formed one spaced apart from another by a certain distance, that is, interstices 26m containing an air layer are formed between the respective bumps. The interstices 26m formed between the micro bumps 30 play an important role, as will be described later. Further, since the gap 60 between the silicon substrate 10 and the optical waveguide 22 formed within the wavelength conversion element 20 can be maintained by the micro bump structure (see FIG. 2), there is no need to form a groove in the silicon substrate 10 in order to provide such a gap, and the fabrication process of the silicon substrate 10 can be simplified.

FIG. 5 is a diagram for explaining how the alignment in height direction is adjusted using the micro bumps. FIG. 5 shows a schematic side view of the optical device 1 of FIG. 1 as viewed from the side thereof.

Not only the micro bumps 30 for bonding the wavelength conversion element 20 but also the micro bumps 33 for bonding the semiconductor laser 3 and the micro bumps 34 for bonding the sub-substrate 4 are formed on the upper surface of the silicon substrate 10. The micro bumps 30, 33, and 34 are similar in structure and configuration.

To describe an example of how these components are mounted, first the micro bumps 30, 33, and 34 are formed on the surface of the silicon substrate 10. Next, by applying a prescribed load K1 to the semiconductor laser 3 by a means not shown while adjusting the position of the semiconductor laser 3 in the direction of its plane, the semiconductor laser 3 is bonded to the silicon substrate 10 with the micro bumps 33 being deformed in the thickness direction according to the load K1.

Next, the thus bonded semiconductor laser 3 is driven to emit infrared light (not shown); in this condition, while adjusting the position of the wavelength conversion element 20 in the direction of its plane, a prescribed load K2 is gradually applied to the wavelength conversion element 20, thus bonding it to the silicon substrate 10 while causing the micro bumps 30 to deform in the thickness direction. At this time, the infrared light from the semiconductor laser 3 is introduced into the optical waveguide 22 of the wavelength conversion element 20, and the light exiting the optical waveguide 22 is detected by a detector not shown; in this condition, the alignment between the semiconductor laser 3 and the wavelength conversion element 20 is adjusted by applying the load until the position that maximizes the exiting light is reached.

Similarly, the semiconductor laser 3 is driven, and while adjusting the position of the sub-substrate 4 with the optical fiber 5 mounted thereon in the direction of its plane, a prescribed load K3 is gradually applied to the sub-substrate 4, thus bonding it to the silicon substrate 10 while causing the micro bumps 34 to deform in the thickness direction. At this time, the light exiting the wavelength conversion element 20 is introduced into the optical fiber 5 fixed to the sub-substrate 4, and the light exiting the optical fiber 5 is detected by a detector not shown; in this condition, the alignment between the wavelength conversion element 20 and the optical fiber 5 is adjusted by applying the load until the position that maximizes the exiting light is reached.

As the semiconductor laser 3 and wavelength conversion element 20 mounted on the silicon substrate 10 and the optical fiber 5 fixed to the sub-substrate 4 are aligned relative to each other as described above, the optical device can achieve highly precise optical coupling. In any optical device that uses laser light, the alignment between elements is extremely important. In the optical device 1, since the thickness of the micro bump structure can be changed by adjusting the load applied when bonding the components for mounting, the alignment in the height direction of each component to be mounted can be adjusted highly precisely, and thus highly precise alignment between the respective elements can be easily achieved.

After mounting the components, if any stress is applied to the wavelength conversion element 20, etc. for any reason, the alignment may become displaced, causing an error in the optical coupling between the elements. However, in the optical device 1, since provisions are made to prevent any stress from being applied to the wavelength conversion element 20, etc., high reliability can be achieved.

Figure 6:
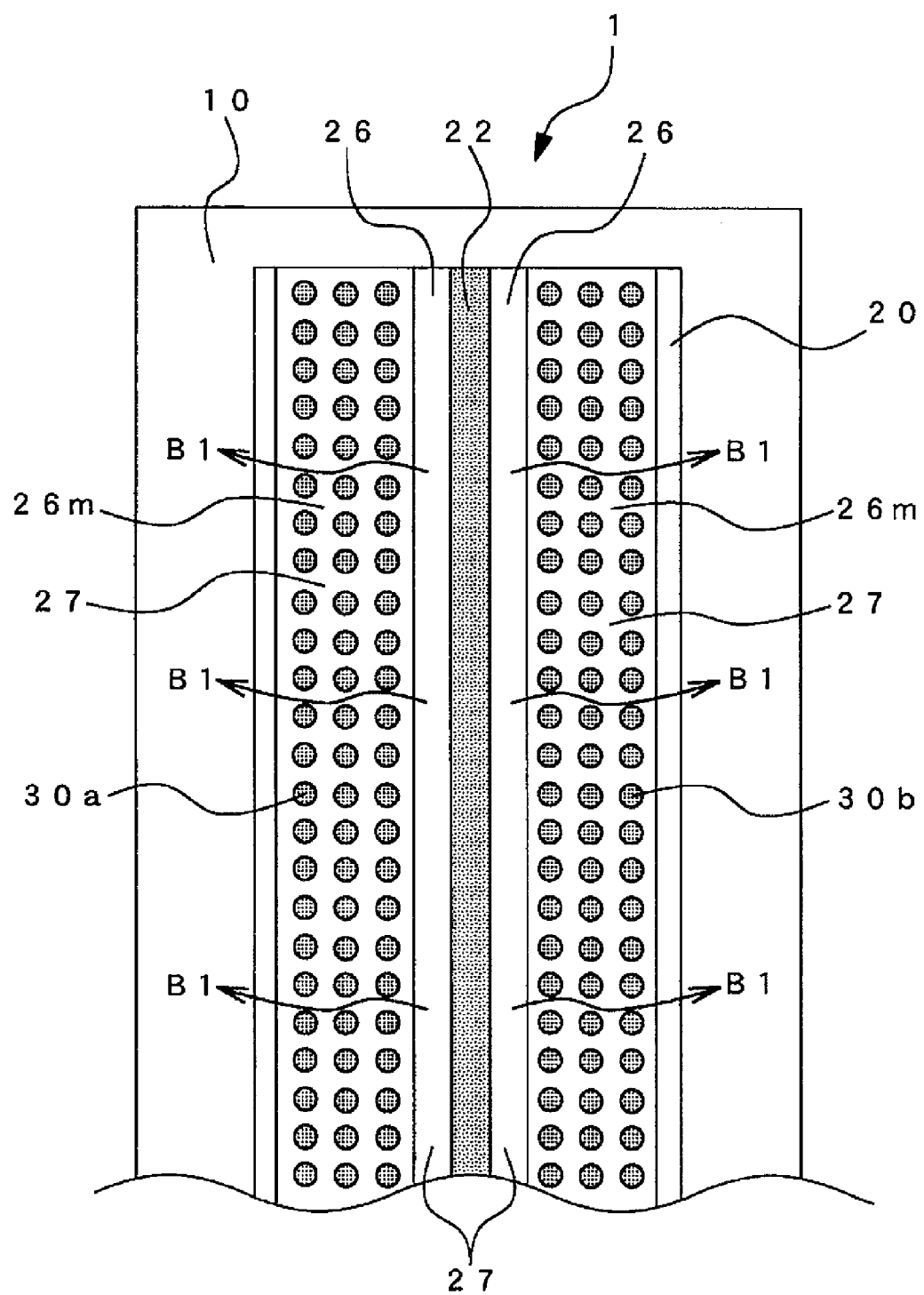
FIG. 6 is a schematic enlarged top plan view of the optical device 1 for explaining the flow of air in the vicinity of an optical waveguide.

FIG. 6 is a schematic enlarged top plan view of the optical device 1 for explaining the flow of air in the vicinity of the optical waveguide. In FIG. 6, the wavelength conversion element 20 is shown in a cutaway view to reveal its internal structure for ease of understanding, and parts other than the wavelength conversion element 20 are omitted.

In FIG. 6, the optical waveguide 22 is substantially centered in the wavelength conversion element 20, the micro bumps 30a and 30b are formed on the left and right sides of the optical waveguide 22 as viewed in the figure, and the wavelength conversion element 20 is bonded to the silicon substrate 10 by the micro bumps 30a and 30b. The micro bumps 30a, 30b are arranged horizontally and vertically to form a rectangular matrix array. In FIG. 6, each array of micro bumps 30a, 30b is shown as being formed from a limited number of bumps for clarity of illustration, but actually, each array is formed from a much larger number of bumps.

The gap 26 is formed in the surrounding area of the optical waveguide 22, and the gap 26 forms an air layer 27. A large number of very thin, substantially two-dimensional interstices 26m are formed between the bumps in each array of micro bumps 30a, 30b, and the air layer 27 extends into the interstices 26m formed between the individual micro bumps 30a, 30b. The ITO film 25 is formed over the entire lower surface of the wavelength conversion element 20, as previously described, but is not shown in FIG. 6.

When the ITO film 25 (see FIG. 2) that functions as the heater is energized via the micro bumps 30a and 30b, the ITO film 25 generates heat and heats the optical waveguide 22 and its surrounding area, causing the air layer 27 in the surrounding area to expand. As the air layer 27 expands, the pressure inside the air layer 27 tries to increase. However, since the air layer 27 forms passages passing through the numerous interstices 26m between the micro bumps 30a and 30b in the left and right directions and leading to the outside of the wavelength conversion element 20, as shown by arrow B1, the pressure inside the air layer 27 is maintained substantially constant.

When the temperature reaches a predetermined value as a result of the heating by the ITO film 25, the supply current to the ITO film 25 is stopped by a control means not shown. At this time, since the heat from the heated optical waveguide 22 and its surrounding area is transmitted via the micro bumps 30a and 30b to the silicon substrate 10 that functions as the heat sink, the temperature of the optical waveguide 22 and its surrounding area drops in a relatively short time.

When the temperature of the optical waveguide 22 and its surrounding area drops, the air layer 27 expanding due to the heating begins to contract, causing the pressure inside the air layer 27 to try to decrease. However, since the outside air flows into the interior of the wavelength conversion element 20 through the numerous interstices 26m between the micro bumps 30a and 30b in the direction opposite to the direction shown by arrow B1, the pressure inside the air layer 27 is maintained substantially constant.

In this way, even if the air layer 27 is repeatedly caused to expand and contract as the temperature of the optical waveguide 22 and its surrounding area rises and falls, the pressure inside the air layer 27 is maintained substantially constant because of the presence of the flow passages (arrow B1) formed by the interstices 26m between the micro bumps 30a and 30b in the air layer 27. This serves to prevent any stress from being applied to the wavelength conversion element 20. This therefore serves to prevent the wavelength conversion element 20 from being strained due to pressure changes in the air layer 27 and hence to solve problems such as variations in the wavelength conversion characteristics and variations in the output light due to misalignment of the wavelength conversion element 20, and an optical device having excellent reliability can thus be achieved.

When the heating through the ITO film 25 stops, the air layer 27 begins to contract, causing the air to flow in the direction opposite to the direction shown by arrow B1; in this case, if any foreign matter such as dust or dirt is contained in the air outside the wavelength conversion element 20, such dust or dirt may be carried in the air and may flow into the gap 26 formed around the optical waveguide 22. If dust, etc. flow into the gap 26, such dust may adhere to the surrounding area of the optical waveguide 22, causing the refractive index of the surrounding area to change and eventually leading to degradation of the wavelength conversion characteristics of the wavelength conversion element 20.

Since the micro bumps 30a and 30b are formed from closely spaced, very thin bumps, as earlier described, the numerous, substantially two-dimensional interstices 26m formed between the micro bumps are very thin and narrow. This structure serves to prevent any dust or dirt large enough to cause a problem from entering through the interstices 26m formed between the micro bumps 30a and 30b. Accordingly, an optical device having excellent reliability and capable of exhibiting stable characteristics over an extended period of time can be achieved by preventing the variations in the characteristics of the wavelength conversion element caused by the effects of the dust, etc. adhering to the surrounding area of the optical waveguide 22.

In the optical device 1, temperature control is performed to maintain the desired temperature by turning on and off the current to the ITO film 25, i.e., the heater, while measuring the temperature. When the current is turned on to the ITO film 25, the optical waveguide 22 and its surrounding area are heated, and when the current is turned off, the optical waveguide 22 and its surrounding area are cooled through the silicon substrate 10 that functions as the heat sink. Since the optical waveguide 22 and its surrounding area are thus held in the proper temperature range, it becomes possible to achieve an optical device that produces high-output stable laser light.

In FIG. 6, the micro bumps 30a, 30b have been shown as being arranged horizontally and vertically in a matrix array, but the arrangement of the bumps is not limited to this particular example.

Figure 7A:
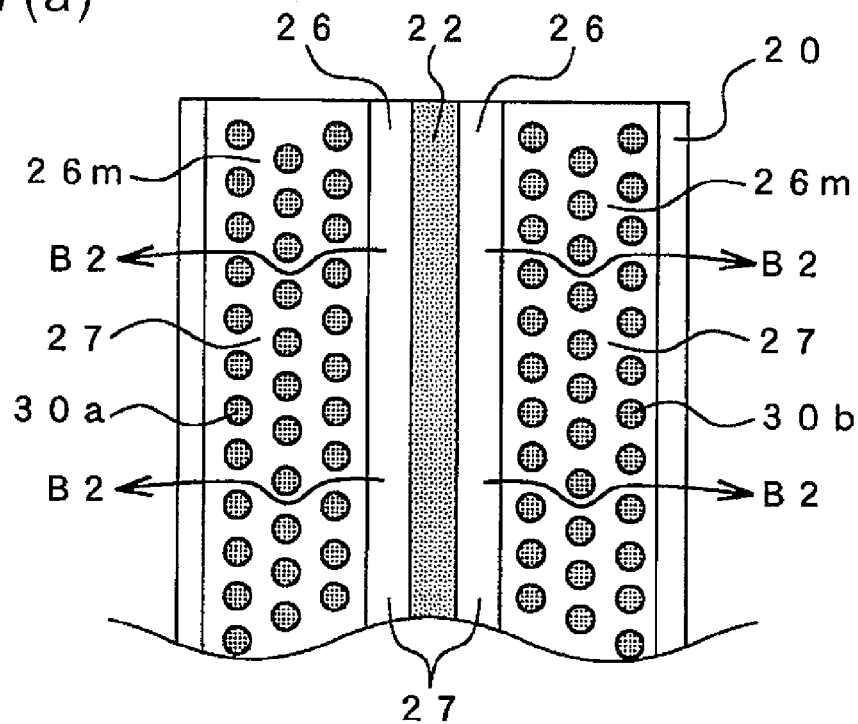
FIG. 7(a) is a diagram showing an example in which the micro bumps 30a, 30b are arranged in a zigzag pattern.
Figure 7B:
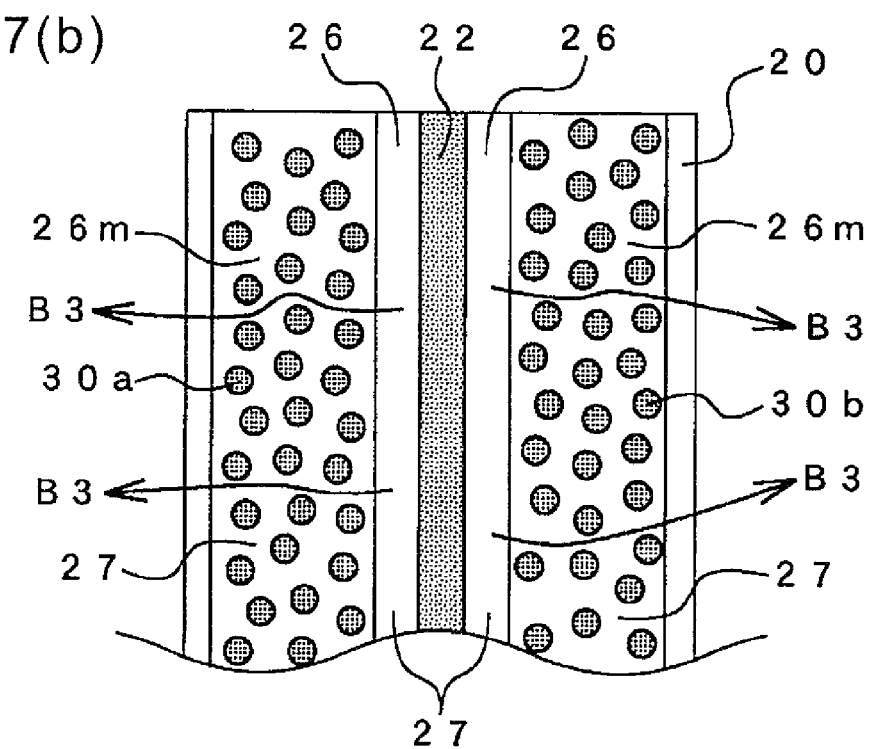
FIG. 7(b) is a diagram showing an example in which the micro bumps 30a, 30b are arranged in a random pattern.

FIG. 7 is a diagram for explaining the flow of air according to alternative examples of the micro bump arrangement. FIG. 7(a) shows an example in which the micro bumps 30a, 30b are arranged in a zigzag pattern, and FIG. 7(b) shows an example in which the micro bumps 30a, 30b are arranged in a random pattern.

In FIG. 7(a), the air layer 27 in the gap 26 surrounding the optical waveguide 22 is repeatedly caused to expand and contract as the current is turned on and off to the ITO film 25; here, the air layer 27 is formed so that the air passes, as shown by arrow B2, through the numerous interstices 26m between the micro bumps 30a, 30b arranged in a zigzag pattern. Accordingly, as the air in the air layer 27 is vented to and drawn in from the outside in alternate fashion, the pressure inside the air layer 27 in the gap 26 is maintained substantially constant. The flow direction of the air during drawing is opposite to the direction shown by arrow B2.

In FIG. 7(b), the air layer 27 in the gap 26 surrounding the optical waveguide 22 is repeatedly caused to expand and contract as the current is turned on and off to the ITO film 25; here, the air layer 27 is formed so that the air passes, as shown by arrow B3, through the numerous interstices 26m between the micro bumps 30a, 30b arranged in a random pattern. Accordingly, as the air is vented to and drawn in from the outside in alternate fashion, the pressure inside the air layer 27 in the gap 26 is maintained substantially constant. The flow direction of the air during drawing is opposite to the direction shown by arrow B3.

The micro bumps 30a, 30b may be arranged in any suitable pattern, whether it be a matrix pattern, a zigzag pattern, or a random pattern, the only requirement being that the micro bumps have a prescribed thickness and be arranged at a prescribed pitch; in any case, the interstices 26m between the bumps provide flow passages for the air layer 27, thus serving to prevent any stress from being applied to the optical waveguide 22. Further, when the micro bumps are arranged in a matrix pattern, a zigzag pattern, a random pattern, or the like, dust, etc. can be prevented from entering from the outside because the gaps between the bumps are extremely narrow and thin.

As earlier described, in the optical device 1, the heater for adjusting the temperature of the wavelength conversion element 20 is formed from the ITO film 25 that covers the entire lower surface of the wavelength conversion element 20, and the ITO film 25 as the heater is disposed in close proximity to the optical waveguide 22 formed within the wavelength conversion element 20. Accordingly, the optical device 1 can perform temperature control (temperature management) efficiently and highly accurately. Furthermore, since the micro bump structure is employed in the optical device 1 for bonding, there is no need to form a groove in the silicon substrate 10, and the optical device 1 achieves excellent reliability by preventing the wavelength conversion element 20 from being strained due to pressure changes, while also preventing dust or dirt from entering the optical waveguide 22.

An InTiO film may be used instead of the ITO film 25. The InTiO film is a film of indium oxide doped with Ti. In the case of an SHG wavelength conversion element that converts near-infrared light at a longer wavelength than 1.2 µm, for example, near-infrared light at 1.26 µm, into visible light of wavelength 0.63 µm, an ITO film may be used, but an InTiO film is preferred for use. The reason is that the InTiO film has a higher transmissivity and lower absorptivity than the ITO film in the longer wavelength region, while retaining about the same electrical conductivity as that of the ITO film.

Figure 8:
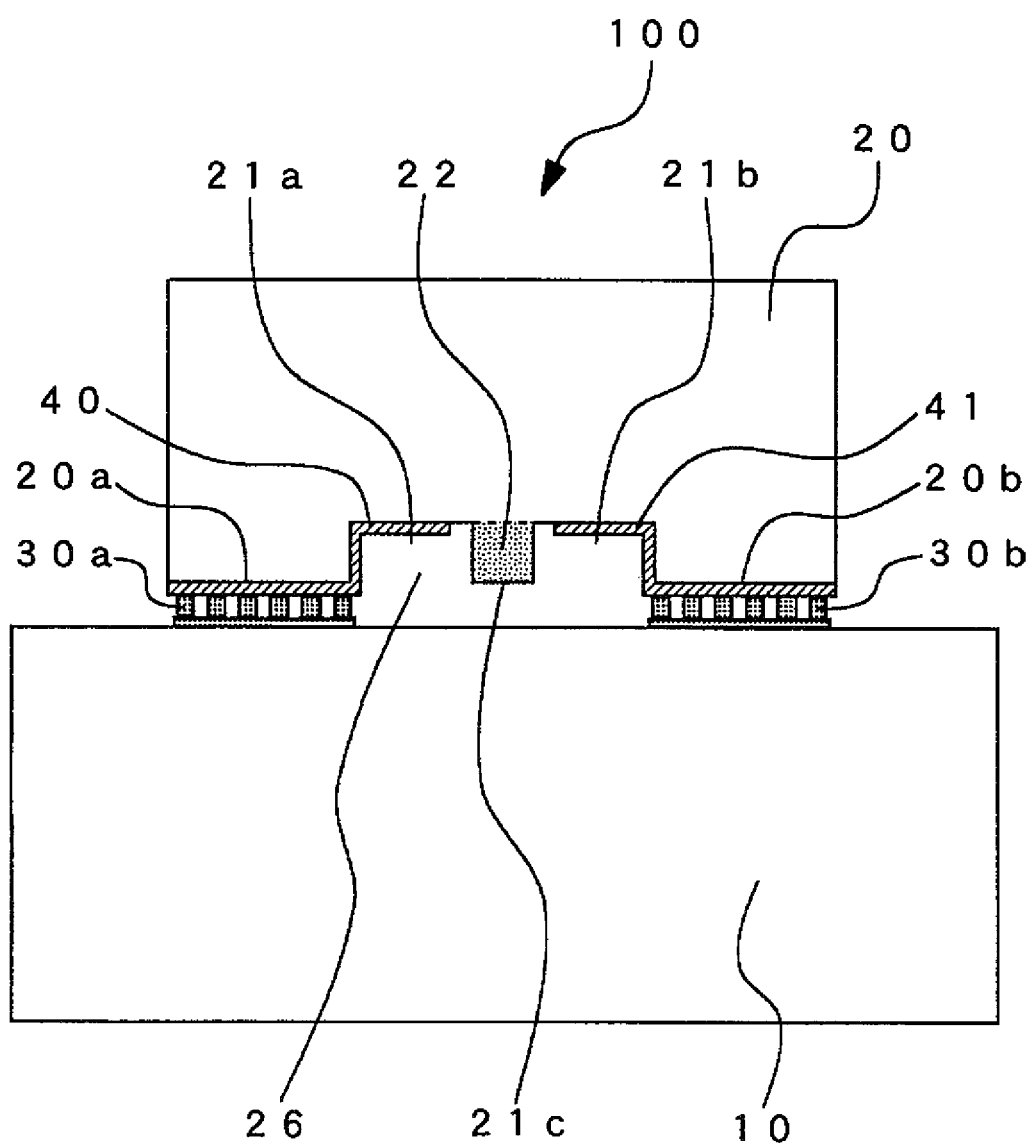
FIG. 8 is a cross-section view of an alternative optical device 100.

FIG. 8 is a cross-section view of an alternative optical device 100. The entire structure of the optical device 100 is substantially the same as that of the optical device 1 shown in FIG. 1, and the cross section of the optical device 100 taken along line corresponding to the line AA' in FIG. 1 is shown in FIG. 8. In the optical device 100, the same elements as those in the optical device 1 are designated by the same reference numerals, and part of the description of such elements will be omitted here.

As in the case of the optical device 1, the wavelength conversion element 20 shown in FIG. 8 is a wavelength conversion element of a ridge-type structure formed from an SHG crystal composed principally of LiNbO3. Two recessed portions 21a and 21b are formed in the lower surface of the optical waveguide 20 so as to extend along the longitudinal direction of the optical waveguide 20, and the optical waveguide 22 is formed in a raised portion 21c defined between the recessed portions 21a and 21b. The optical device 100 is equipped with a ridge-type wavelength conversion element as the optical element, and a heater for adjusting the temperature of the wavelength conversion element is formed by depositing an Au film over the lower surface of the wavelength conversion element everywhere except the area surrounding the optical waveguide of the wavelength conversion element.

More specifically, thin Au films 40 and 41 are formed over the lower surface portions that flank the optical waveguide 22 formed in the lower surface of the wavelength conversion element 20, that is, over the planar portions 20a and 20b and over part of the recessed portions 21a and 21b. Part of each Au film 40, 41 is formed so as to extend along the optical waveguide 22 and functions as a heater for heating the optical waveguide 22, but the detailed geometric patterns of the Au films 40 and 41 will be described later. The Au films 40 and 41 are not formed in the vicinity of the optical waveguide 22 but are formed so as to be spaced a certain distance away from the optical waveguide 22.

As in the optical device 1, the micro bumps 30a and 30b of Au having a prescribed thickness and having excellent electrical and thermal conductivity are formed on the upper surface of the silicon substrate 10 at positions that face the planar portions 20a and 20b of the wavelength conversion element 20. By aligning the micro bumps 30a and 30b on the silicon substrate 10 with the Au films 40 and 41 formed on the planar portions 20a and 20b of the wavelength conversion element 20 and by pressing them together, the silicon substrate 10 and the wavelength conversion element 20 can be bonded together by surface activation at normal temperature.

The formation of the micro bumps 30a and 30b results in the formation of a gap 26, i.e., an air layer, between the wavelength conversion element 20 and the silicon substrate 10. The gap 26 serves to prevent the optical waveguide 22 formed in the lower surface of the wavelength conversion element 20 from coming into contact with the silicon substrate 10, and the left and right sides and the underside of the optical waveguide 22 are covered with the air layer. That is, because of the presence of the gap 26, the three sides, i.e., the left and right sides and the underside, of the optical waveguide 22 are contacted with the air layer, and light can be confined within the optical waveguide 22 by utilizing the refractive index difference relative to the surrounding air layer.

Figure 9:
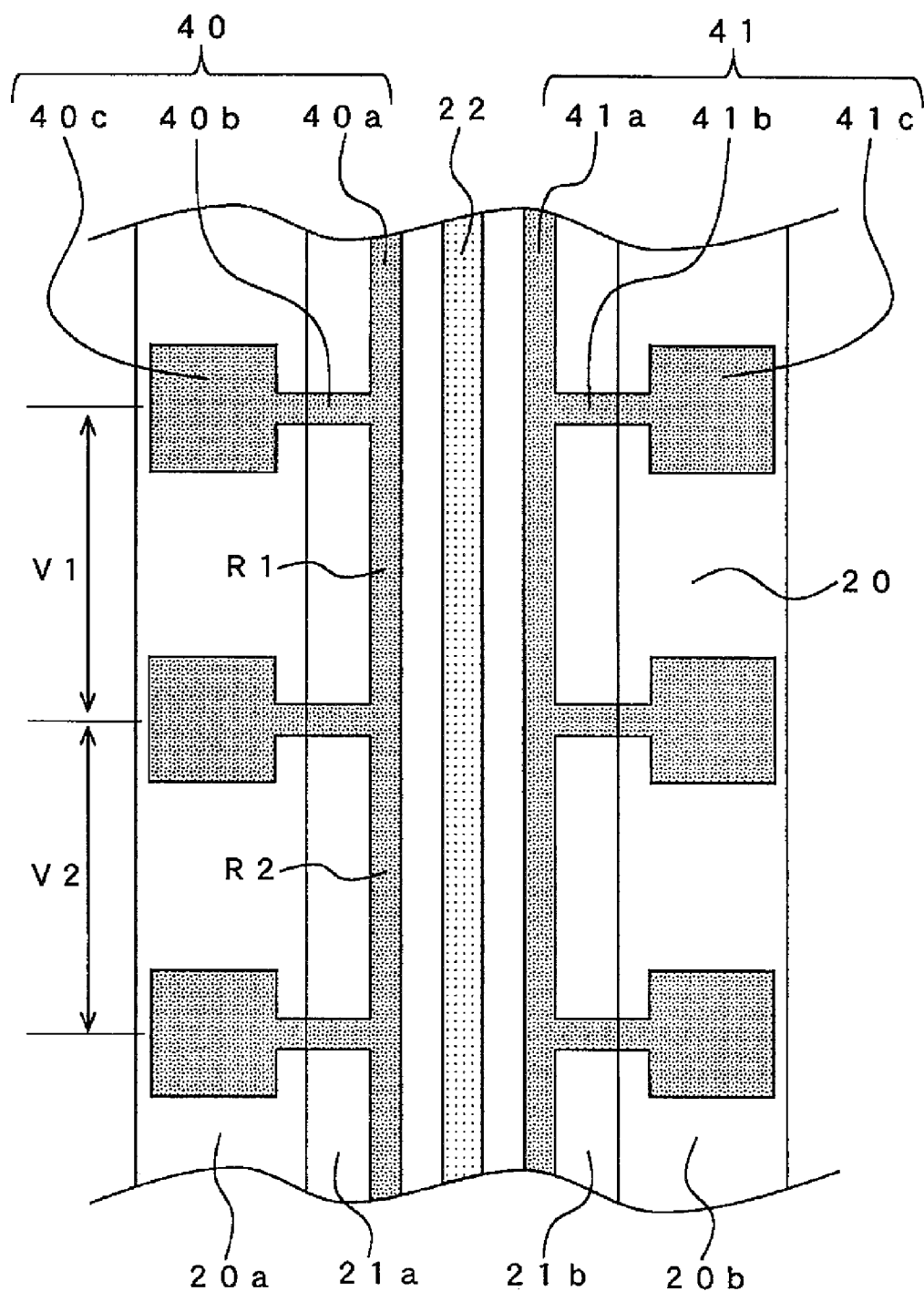
FIG. 9 is a top plan view showing in enlarged form a portion of the wavelength conversion element 20 incorporated in the optical device 100.

FIG. 9 is a top plan view showing in enlarged form a portion of the wavelength conversion element 20 incorporated in the optical device 100.

As shown in FIG. 9, the optical waveguide 22 is formed substantially centered in the wavelength conversion element 20 and extending along the longitudinal direction thereof, and the Au films 40 and 41 that together function as the heater are formed on the lower surface of the wavelength conversion element 20 in such a manner as to flank the optical waveguide 22 on both sides.

The Au films 40 and 41 include heater portions 40a and 41a, respectively. The heater portions 40a and 41a are each formed as a narrow strip having a prescribed electrical resistance, and are disposed so as to flank the optical waveguide 22 on both sides along the longitudinal direction thereof and so as to be spaced a certain distance away from the respective sides of the optical waveguide 22. Each heater portion 40a, 41a is connected to a plurality of lead portions 40b, 41b formed at predetermined spaced intervals, and each lead portion 40b, 41b is connected to an electrode 40c, 41c. That is, each Au film 40, 41 includes the heater portion 40a, 41a, the plurality of lead portions 40b, 41b, and the plurality of electrodes 40c, 41c.

As shown in FIG. 9, the heater portions 40a and 41a of the Au films 40 and 41 are formed on the recessed portions 21a and 21b, respectively, of the wavelength conversion element 20, and the electrodes 40c and 401c are formed on the planar portions 20a and 20b, respectively, while the lead portions 40b and 41b are formed so as to extend from the respective recessed portions 21a and 21b to the respective planar portions 20a and 20b. FIG. 8 is a cross-sectional view taken substantially along the center of one pair of opposing lead portions shown in FIG. 9.

The micro bumps 30a and 30b (see FIG. 8) are formed on the silicon substrate 10 at positions opposing the respective electrodes 40c and 41c. As earlier described for the optical device 1, when the wavelength conversion element 20 and the silicon substrate 10 are pressed together, the wavelength conversion element 20 is bonded to the silicon substrate 10 by surface activation at normal temperature, and thus the two members are mechanically, electrically, and thermally bonded together. When prescribed voltage is supplied from the silicon substrate 10 to the plurality of electrodes 40c and 41c via the micro bumps 30a and 30b after the normal temperature activated bonding, current flows through the heater portions 40a and 41a which thus generate heat to heat the optical waveguide 22 and its surrounding area so that the temperature can be adjusted.

As an example, suppose that a voltage V1 is applied across one pair of electrodes 40c shown in FIG. 9 and that a different voltage V2 is applied across another pair of electrodes 40c. Here, the electrical resistance of the section of the heater portion 40a to which the voltage V1 is applied is denoted by R1, and the electrical resistance of the section of the heater portion 40a to which the voltage V2 is applied is denoted by R2.

Even when the electrical resistance values R1 and R2 are the same, if the applied voltages V1 and V2 are different, different amounts of current according to the different voltages flow through the respective sections of the heater portion 40a that are connected to the different pairs of electrodes 40c; as a result, the sections of the heater portion 40a connected to the respective pairs of electrodes 40c each generate the amount of heat that differs according to the current and the electrical resistance of that section. That is, when the heater portion 40a is provided with the plurality of electrodes 40c at predetermined spaced intervals, the temperature of the optical waveguide 22 can be adjusted on a block-by-block basis by dividing the optical waveguide 22 into a corresponding number of blocks and by applying a different voltage across each different pair of electrodes.

For example, for the blocks of the optical waveguide 22 that are located nearer to the edge of the optical device, the temperature is adjusted higher because such blocks are susceptible to outside air, and for the blocks of the optical waveguide 22 that are located nearer to the center of the optical device, the temperature is adjusted lower; in this way, temperature control can be performed meticulously according to the outside environment. The above example has been described for the heater portion 40a on the left side of the optical waveguide 22 in the figure but, for the heater portion 41a on the right side also, the temperature can be adjusted on a block-by-block basis by applying a different voltage across each different pair of electrodes 41c. It is preferable to perform the temperature adjustment simultaneously for both the left and right heater portions 40a and 41a, but if necessary, the temperature adjustment may be performed separately for the left and right sides.

The optical device 100 has been described by taking as an example the structure in which each heater portion is provided with a plurality of electrodes so that the temperature can be adjusted on a block-by-block basis, but the structure is not limited to this particular example; for example, to simplify the control operation, the electrodes may be provided only at both ends of the heater portion, and a prescribed voltage may be applied thereacross to adjust the temperature for the entire heater portion at once.

Since the heater for heating the optical waveguide 22 is formed by the Au films 40 and 41, as described above, the optical device 100 has the advantage that there is no need to form an additional Au film on the lower surface of the wavelength conversion element 20 for bonding to the micro bumps 30a and 30b formed on the silicon substrate 10. This simplifies the fabrication process of the wavelength conversion element 20, compared with the optical device 1 that requires the formation of Au films on the surface of the ITO film. Furthermore, since the heater portions 40a and 41a of the Au films 40 and 41 are formed along the longitudinal direction of the optical waveguide 22, a further advantage is that the heat from the heater portions 40a and 41a can be efficiently transmitted to the optical waveguide 22 and its surrounding area.

Since the gap 26 (see FIG. 8) is formed between the wavelength conversion element 20 and the silicon substrate 10 by employing the micro bump structure, as in the optical device 1, the optical device 100 has the advantage that there is no need to form a groove or the like in the silicon substrate 10. Further, in the optical device 100, as in the optical device 1, the provision of the flow passages for the air layer surrounding the optical waveguide 22 serves to prevent any stress from being applied to the optical waveguide 22. Furthermore, since the micro bump structure contains a large number of very thin and narrow interstices, as in the case of the optical device 1, the optical device 100 has the additional advantage of being able to prevent dust, etc. from entering and adhering to the surrounding area of the optical waveguide 22.

In the optical device 100, the ITO film used in the optical device 1 may be used instead of the Au films 40 and 41 that function as the heater. In this case, the Au films 23a and 23b are formed on the surfaces of the planar portions 20a and 20b of the wavelength conversion element 20 on which the ITO film is formed, and the Au films 23a and 23b are bonded to the micro bumps 30a and 30b formed on the silicon substrate 10.

Figure 10:
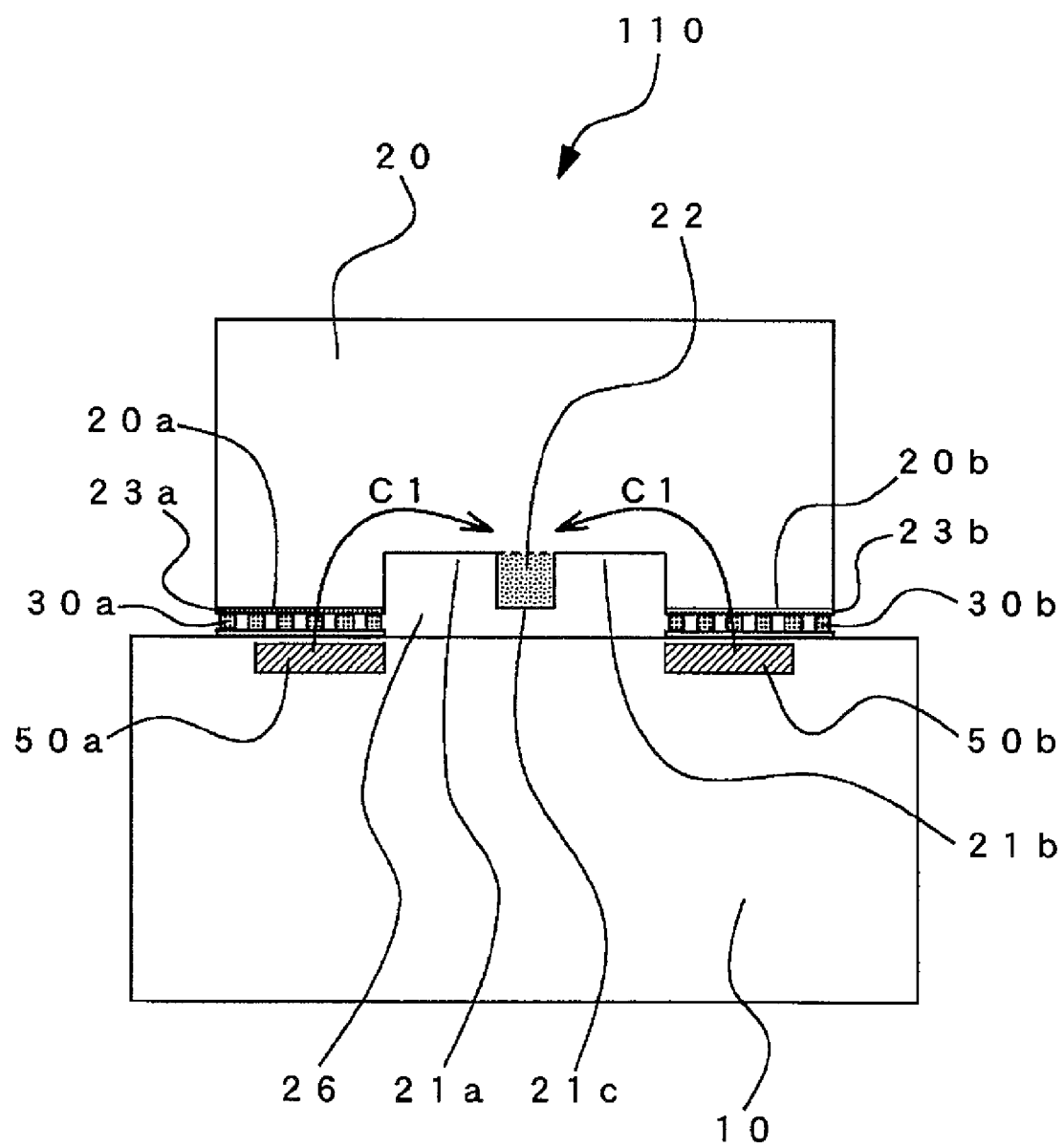
FIG. 10 is a cross-section view of a further alternative optical device 110.

FIG. 10 is a cross-section view of a further alternative optical device 110. The entire structure of the optical device 110 is substantially the same as that of the optical device 1 shown in FIG. 1, and the cross section of the optical device 110 taken along line corresponding to the line AA' in FIG. 1 is shown in FIG. 10. In the optical device 110, the same elements as those in the optical device 1 are designated by the same reference numerals, and part of the description of such elements will be omitted here.

As in the case of the optical device 1, the wavelength conversion element 20 shown in FIG. 10 is a wavelength conversion element of a ridge-type structure formed from an SHG crystal composed principally of LiNbO3. Two recessed portions 21a and 21b are formed in the lower surface of the optical waveguide 20 so as to extend along the longitudinal direction of the optical waveguide 20, and the optical waveguide 22 is formed in a raised portion 21c defined between the recessed portions 21a and 21b. Since the optical waveguide 22 is formed in the raised portion 21c defined between the recessed portions 21a and 21b, the three sides of the optical waveguide 22 are contacted with the air layer, and therefore, light can be confined by utilizing the refractive index difference relative to the surrounding air layer. Au films 23a and 23b are formed on two planar portions 20a and 20b of the lower surface of the wavelength conversion element 20 everywhere except where the recessed portions 21a and 21b are formed. The optical device 110 is equipped with a ridge-type wavelength conversion element as the optical element, and the heater for adjusting the temperature of the wavelength conversion element is mounted on the silicon substrate side to which the wavelength conversion element is bonded.

As in the optical device 1, the micro bumps 30a and 30b of Au having excellent electrical and thermal conductivity are formed on the upper surface of the silicon substrate 10 at positions that face the planar portions 20a and 20b of the wavelength conversion element 20. With this structure, the micro bumps 30a and 30b on the silicon substrate 10 are bonded to the Au films 23a and 23b on the lower surface of the wavelength conversion element 20 by surface activation at normal temperature, and the silicon substrate 10 and the wavelength conversion element 20 are thus bonded together.

Heaters 50a and 50b as temperature adjusting means for adjusting the temperature of the wavelength conversion element 20 are formed in the surface regions of the silicon substrate 10 that are located directly below the respective micro bumps 30a and 30b. In other words, the micro bumps 30a and 30b are formed above and in close proximity to the respective heaters 50a and 50b. This means that the heaters 50a and 50b as well as the micro bumps 30a and 30b are disposed opposite each other across the optical waveguide 22 of the wavelength conversion element 20. Neither the heaters 50a and 50b nor the micro bumps 30a and 30b are formed in the region directly below the optical waveguide 22, but they are formed in regions spaced away from the region directly below the optical waveguide 22.

As shown in FIG. 10, the heat generated by energizing the heaters 50a and 50b is transmitted, via the micro bumps 30a and 30b having good thermal conductivity, to the region near the optical waveguide 22 of the wavelength conversion element 20 by the route indicated by arrow C1. Accordingly, with the heat generated by energizing the heaters 50a and 50b, the optical waveguide 22 can be efficiently heated to adjust the temperature thereof. The details of the micro bumps 30a and 30b and the heaters 50a and 50b will be described later.

Figure 11:
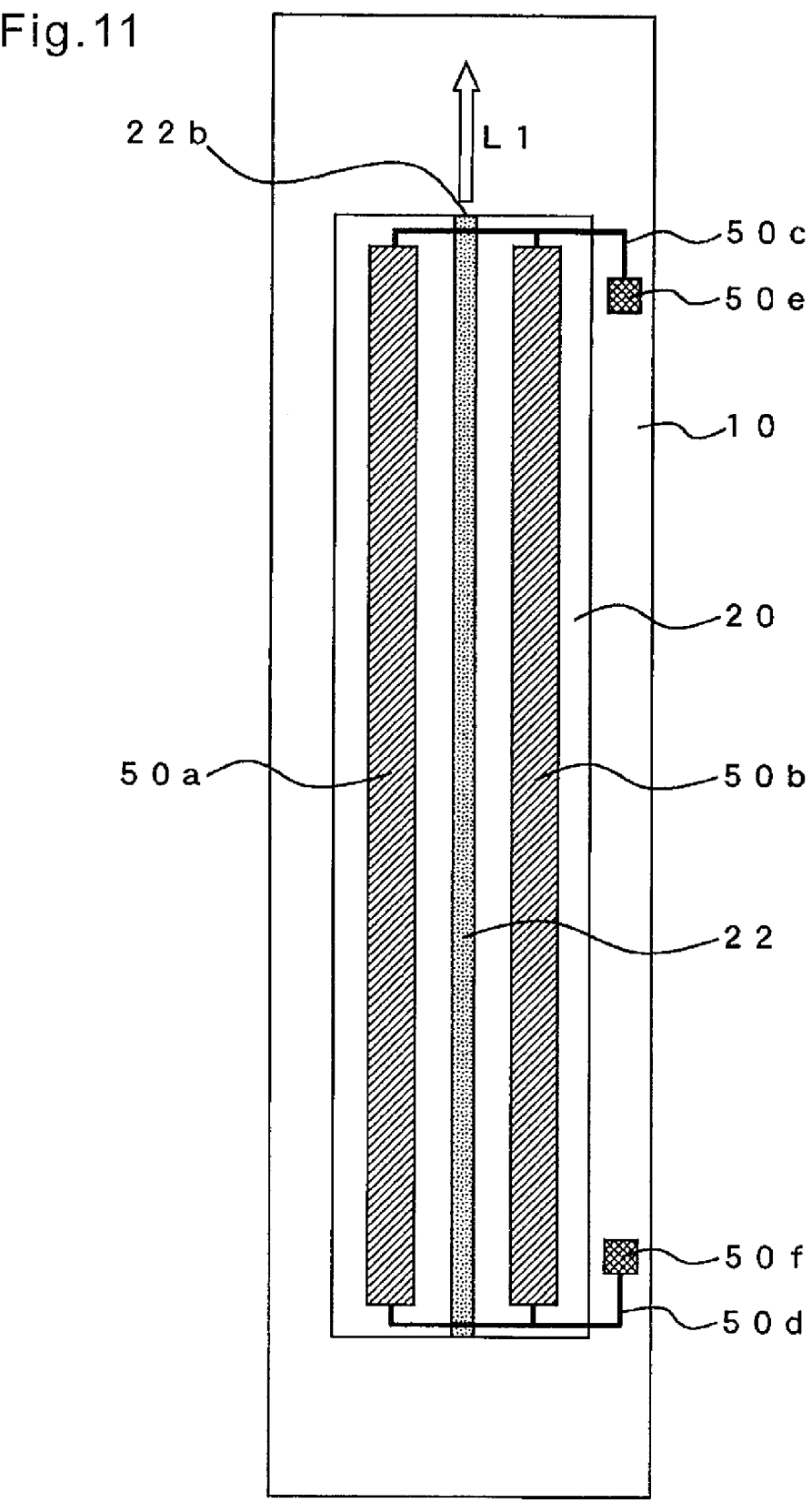
FIG. 11 is a top plan view schematically showing the silicon substrate 10 and the wavelength conversion element 20 in the optical device 110 of FIG. 10.

FIG. 11 is a top plan view schematically showing the silicon substrate 10 and the wavelength conversion element 20 in the optical device 110 of FIG. 10.

In FIG. 11, the semiconductor laser 3, the sub-substrate 4, and the micro bumps 30a and 30b are omitted from illustration, and a cutaway perspective view is shown in order to clarify the positional relationship between the silicon substrate 10 and the wavelength conversion element 20. In FIG. 11, the optical waveguide 22 is formed extending along the longitudinal direction of the wavelength conversion element 20 from one end to the other end thereof, and the laser light L1 at the harmonic wavelength is emitted from the exit face 22b at the upper end of the optical waveguide 22 as viewed in the figure.

The two heaters 50a and 50b are formed in the vicinity of the optical waveguide 22 so as to extend along the left and right sides of the optical waveguide 22 in such a manner as to flank the optical waveguide 22 on both sides. The temperature can be adjusted by uniformly heating the entire structure of the optical waveguide 22 with the heaters 50a and 50b. The heaters 50a and 50b are connected in parallel by interconnection patterns 50c and 50d, and are connected to electrodes 50e and 50f formed on the silicon substrate 10. When a prescribed current is supplied by applying a voltage to the electrodes 50e and 50f from the outside, the heaters 50a and 50b are energized to generate heat so that the temperature of the optical waveguide 22 of the wavelength conversion element 20 can be adjusted.

In the optical device 110, the two heaters 50a and 50b are formed in the silicon substrate 10 in such a manner as to flank the surface region directly below the optical waveguide 22, and the Au micro bumps 30a and 30b are disposed above and in close proximity to the respective heaters 50a and 50b. Accordingly, the heat generated by the heaters 50a and 50b formed in the silicon substrate 10 can be efficiently transmitted via the micro bumps 30a and 30b to the optical waveguide 22 to adjust the temperature of the optical waveguide 22.

As shown in FIG. 10, the optical device 110 employs a structure in which the micro bumps 30a and 30b and the heaters 50a and 50b are formed directly below the respective planar portions 20a and 20b of the wavelength conversion element 20 and no micro bumps nor heaters are formed directly below the optical waveguide 22. The reasons for employing such a structure are the same as the reasons given in the description of the optical device 1 for not forming the micro bumps directly below the optical waveguide 22; therefore, the description will not be repeated here.

If a heater driving circuit for driving the heaters 50a and 50b is built into the silicon substrate 10, the electrodes 50e and 50f for making external connections are not necessary, and both ends of the heaters 50a and 50b are connected to the built-in heater driving circuit. Not only the heater driving circuit but also various other circuits such as a circuit for driving the semiconductor laser 3 (see FIG. 2) may be build into the silicon substrate 10.

In the optical device 110, since the heaters for adjusting the temperature of the wavelength conversion element 20 are formed in the regions near the surface of the silicon substrate 10, as described above, there is no need to form a heater on the wavelength conversion element 20 side, and hence the fabrication process of the wavelength conversion element 20 can be simplified. Furthermore, since the heaters 50a and 50b can be formed in the silicon substrate 10 in the semiconductor process used to fabricate the silicon substrate 10, there is no need to add a heater fabrication step, and as a result, the optical device can be fabricated efficiently.

Since the gap 26 (see FIG. 10) is formed between the wavelength conversion element 20 and the silicon substrate 10 by employing the micro bump structure, as in the optical device 1, the optical device 110 has the advantage that there is no need to form a groove or the like in the silicon substrate 10. Further, in the optical device 110, as in the optical device 1, the provision of the flow passages for the air layer surrounding the optical waveguide 22 serves to prevent any stress from being applied to the optical waveguide 22. Furthermore, since the micro bump structure contains a large number of very thin and narrow interstices, as in the case of the optical device 1, the optical device 110 has the additional advantage of being able to prevent dust, etc. from entering and adhering to the surrounding area of the optical waveguide 22.

While the optical devices 1, 100, and 110 have each been described above by taking as an example the case where the wavelength conversion element is of a ridge-type structure, it will be recognized that the wavelength conversion element is not limited to the ridge type, but use may be made, for example, of an embedded-type wavelength conversion element or a wavelength conversion element fabricated by a proton-exchange method. Further, the optical element is not limited to the wavelength conversion element, but an optical element having other functions may be used. Furthermore, the heaters for adjusting the temperature of the wavelength conversion element may be provided on both the wavelength conversion element side and the silicon substrate side.

The optical devices 1, 100, and 110 can be widely used as short-wavelength laser light sources, such as blue or green laser light sources, in a variety of applications including laser projectors, laser light illumination equipment, optical tweezers, and the like.

Figure 12:
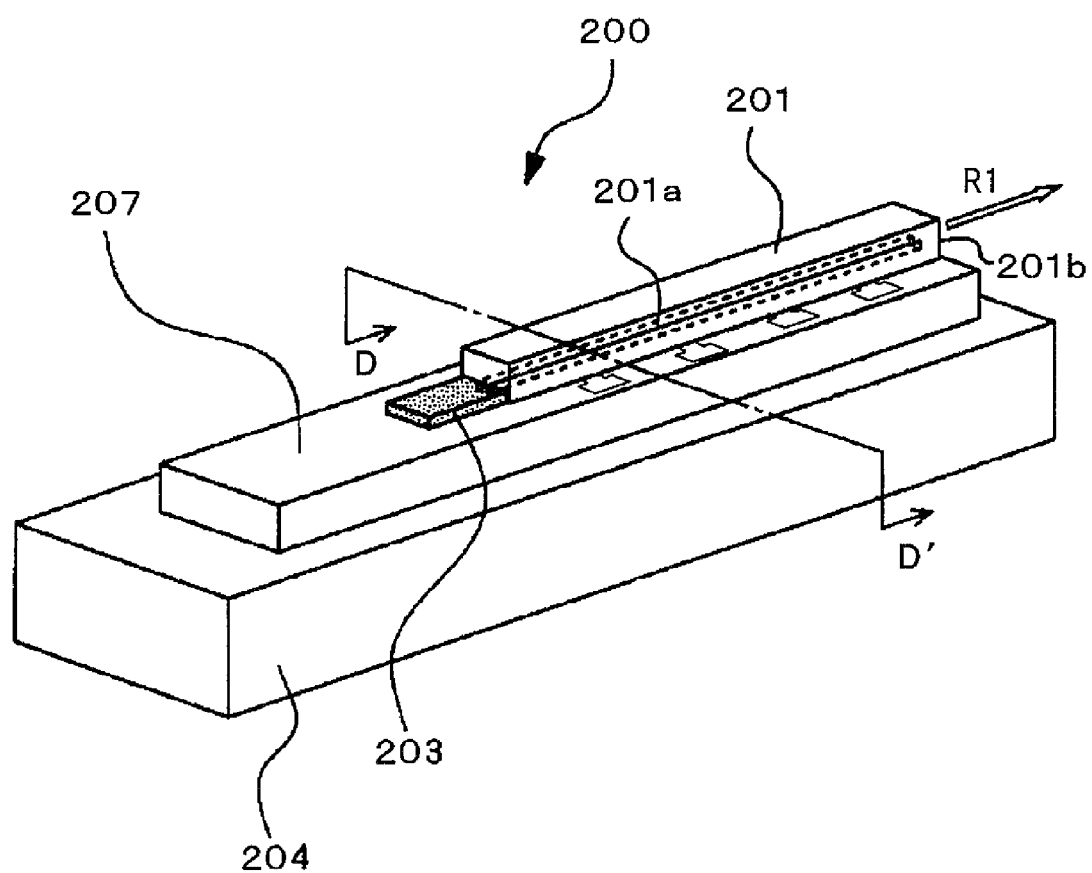
FIG. 12 is a diagram schematically showing the overall construction of a still further alternative optical device 200.

FIG. 12 is a diagram schematically showing the overall construction of a still further alternative optical device 200.

As shown in FIG. 12, the optical device 200 comprises a plate-like silicon substrate 207, a wavelength conversion element 201 as an optical element bonded to the silicon substrate 207, and a semiconductor laser 203 for emitting laser light.

The optical device 200 is supported on a metallic member 204 which serves as a packaging member. For convenience, the metallic member 204 here is shown as having a plate-like shape. The metallic member 204 not only serves to fixedly support the silicon substrate 207 thereon and mechanically protect the entire structure of the optical device 200, but also serves as a heat sinking means for the optical device 200.

The semiconductor laser 203 emits infrared light at its fundamental wavelength (not shown) when a drive current is supplied from the silicon substrate 207 by a means not shown. The infrared light emitted from the semiconductor laser 203 is introduced into a waveguide 201a (indicated by dashed lines) formed within the wavelength conversion element 201; the infrared light is then converted into its harmonic as it is passed through the waveguide 201a, and emerges from an exit face 201b of the waveguide 201a as a green or blue laser light R1.

In one example, the semiconductor laser 203 emits infrared light of wavelength 1064 nm, and the wavelength conversion element 201 converts it into green laser light having a wavelength of 532 nm. In another example, the semiconductor laser 203 emits infrared light of wavelength 860 nm, and the wavelength conversion element 201 converts it into blue laser light having a wavelength of 430 nm. In either example, the optical device 200 shown in FIG. 12 can be used as a light source for a compact projector or the like that uses laser light as the light source.

Figure 13:
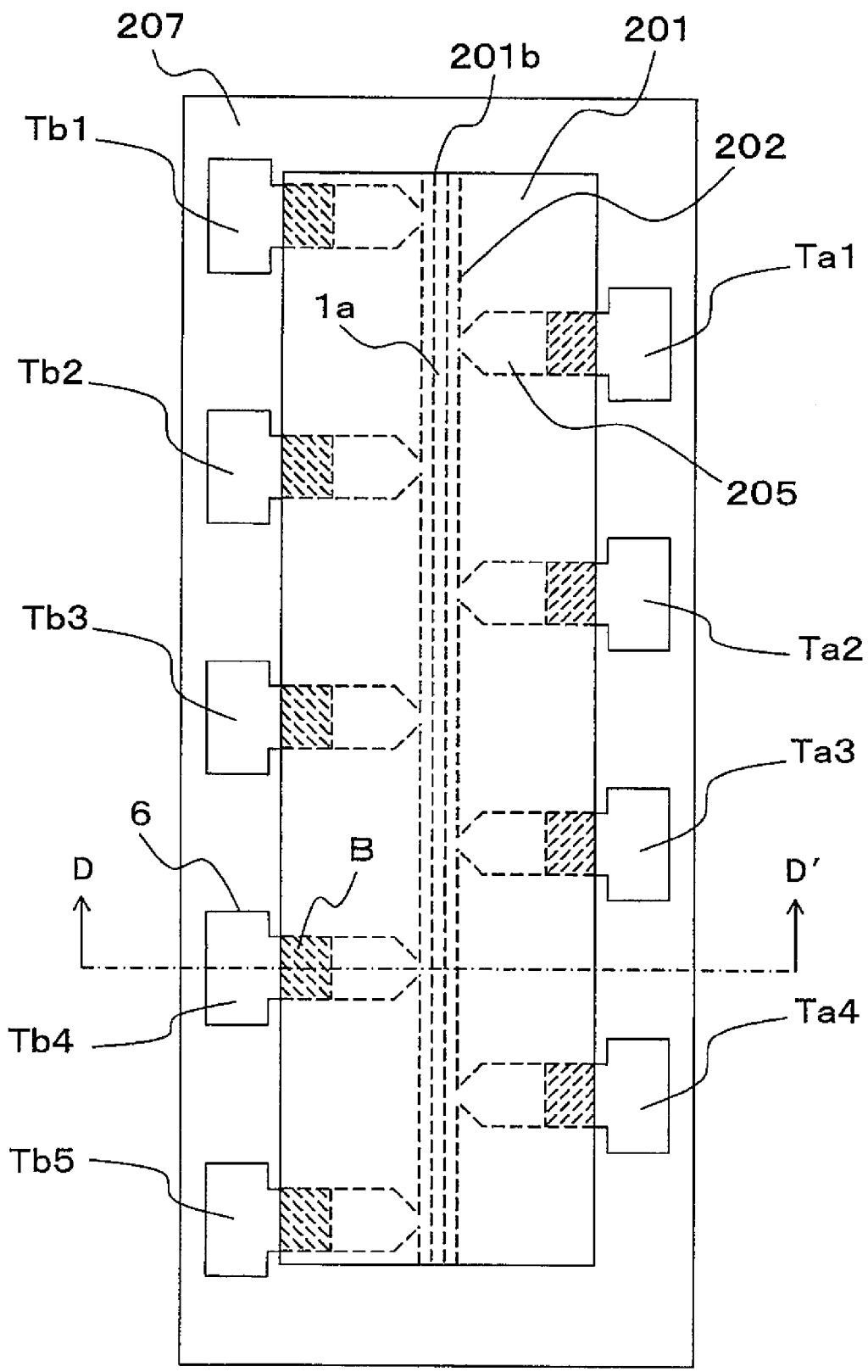
FIG. 13 is a plan view of the optical device 200.
Figure 14:
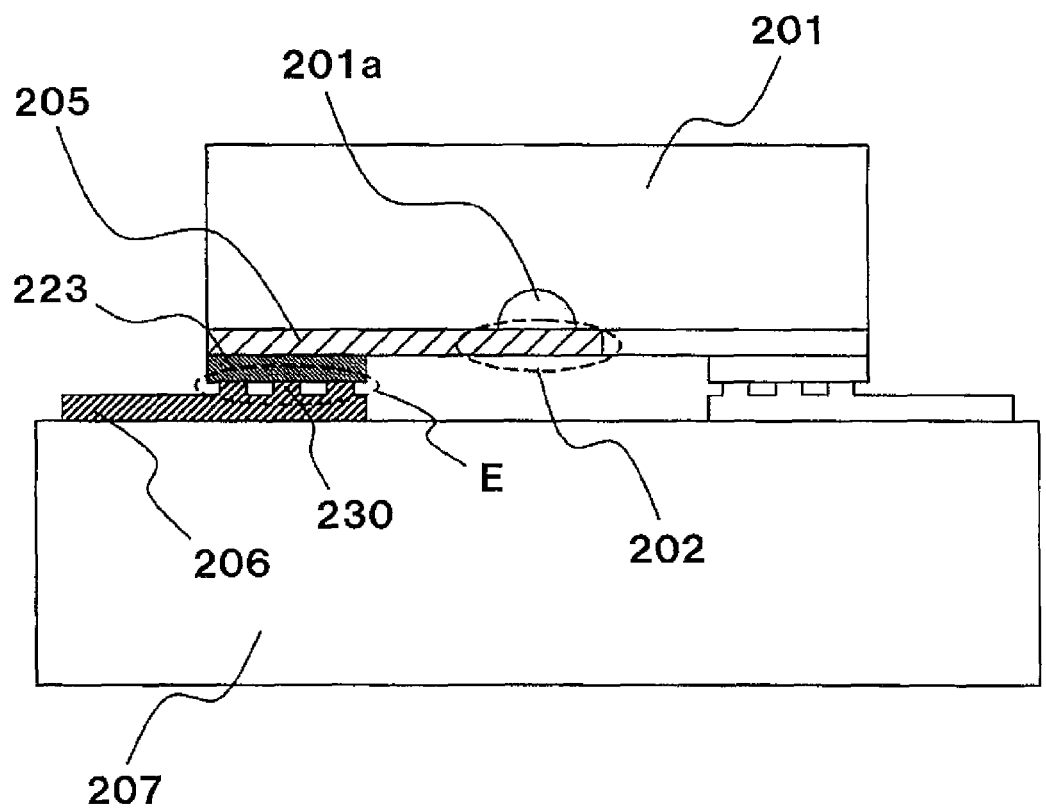
FIG. 14 is a cross-sectional view taken along line D-D' in FIG. 13.
Figure 15:
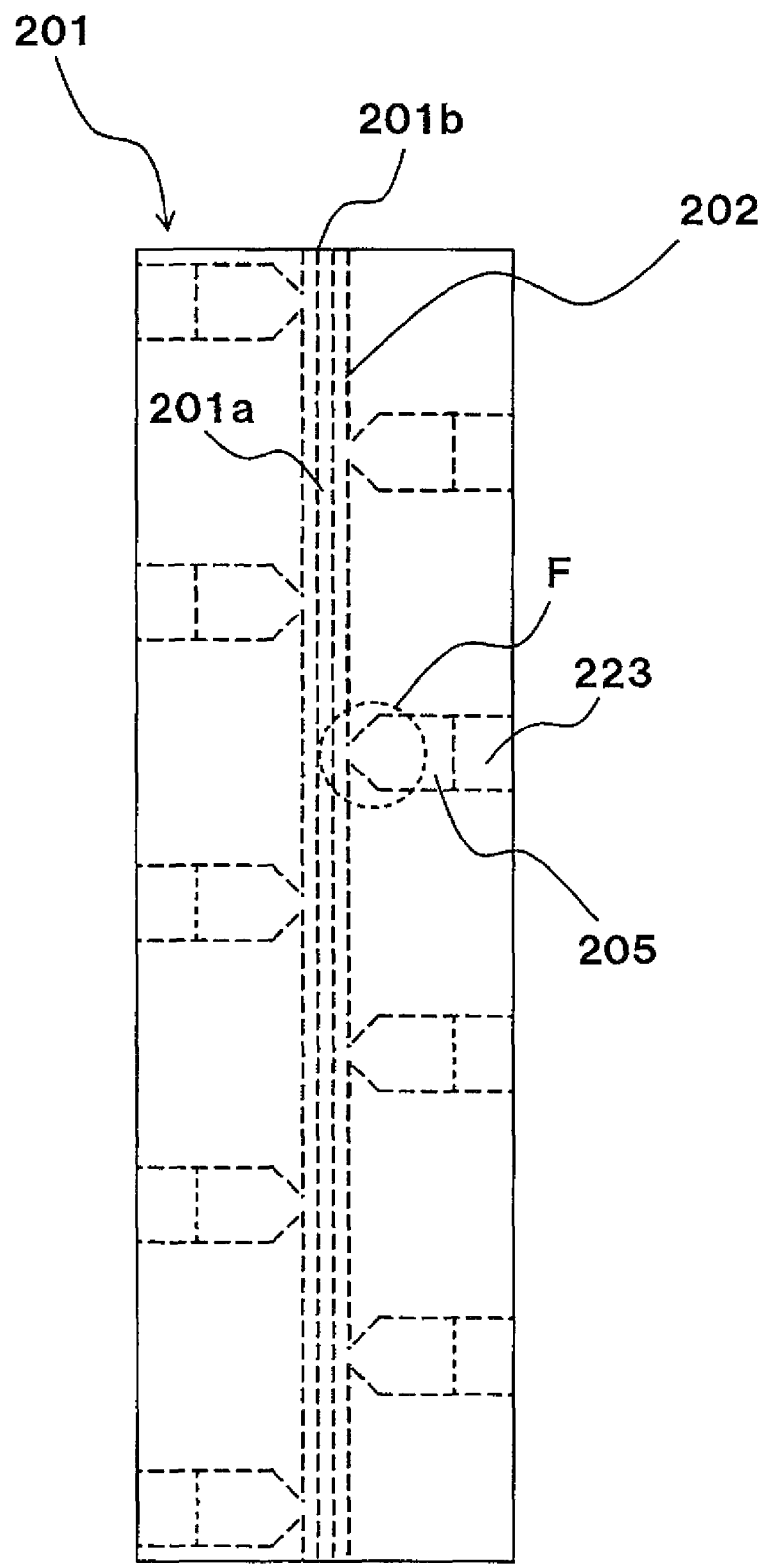
FIG. 15 is a plan view of a wavelength conversion element 201.
Figure 16:
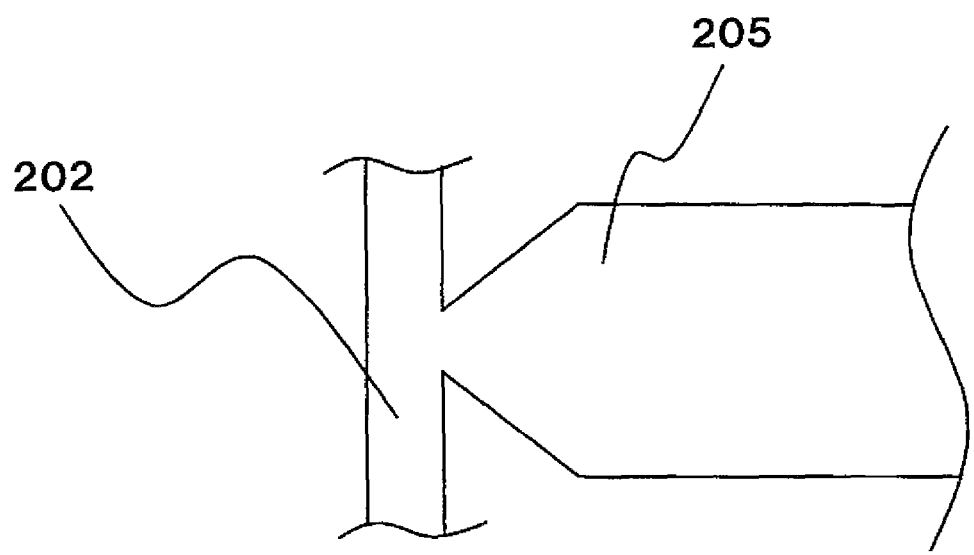
FIG. 16 is an enlarged view of a portion where a lead is connected to a heater.
Figure 17:
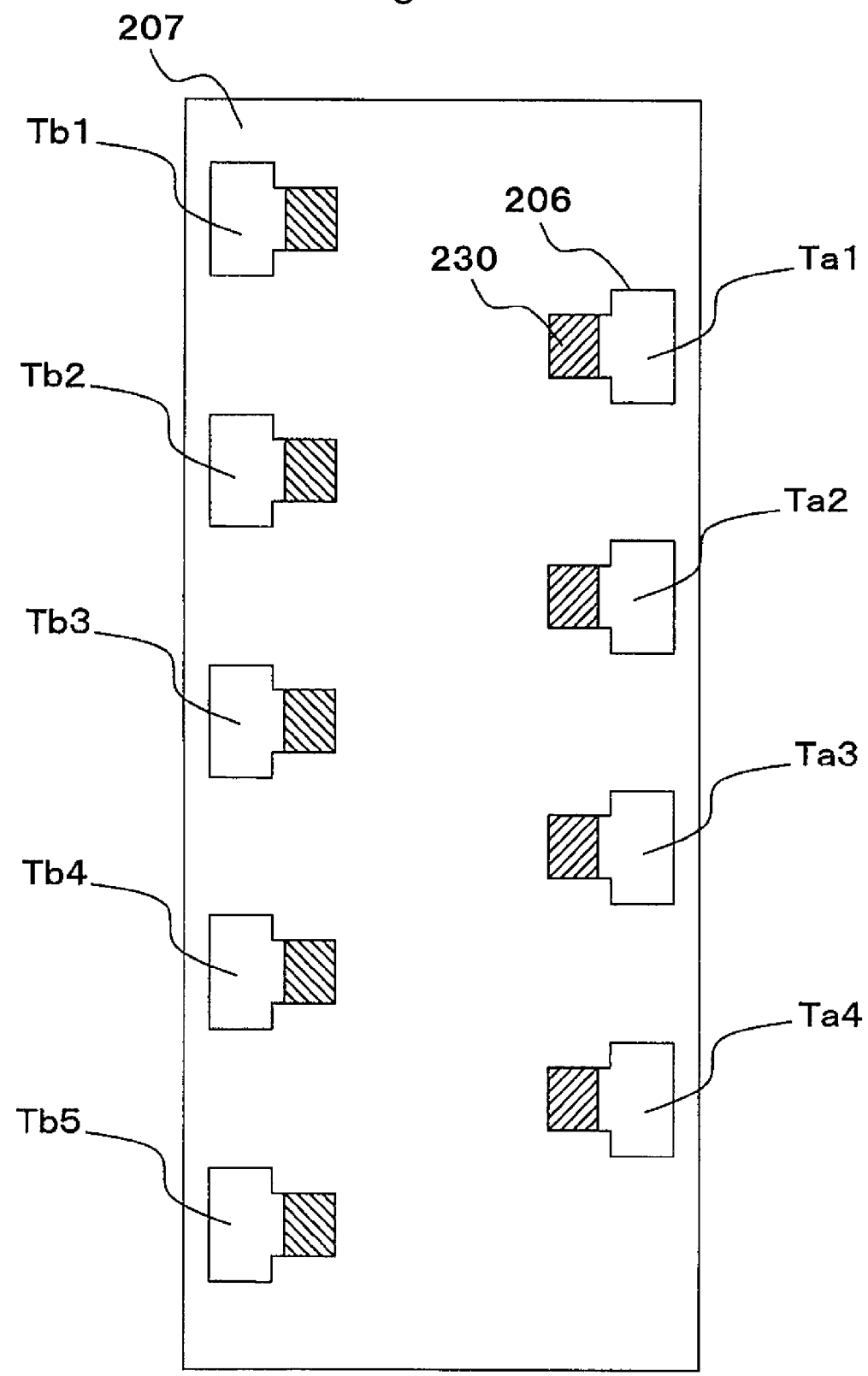
FIG. 17 is a plan view of a silicon substrate 207.

FIG. 13 is a plan view of the optical device 200, and FIG. 14 is a cross-sectional view taken along line D-D' in FIG. 13. In FIGS. 13 and 14, the metallic member 204 is omitted. FIG. 15 is a plan view of the wavelength conversion element 201, and corresponds to the plan view of the optical device 200 shown in FIG. 13. FIG. 16 is an enlarged view of a portion where a lead is connected to a heater. FIG. 17 is a plan view of the silicon substrate 207. FIG. 17 corresponds to the plan view of the optical device 200 shown in FIG. 13.

The wavelength conversion element 201 is a wavelength conversion element of a proton-exchanged type formed from an SHG crystal composed principally of LiNbO3. As shown in FIGS. 13 to 15, the waveguide 201a is formed by a proton-exchange method in such a manner as to be substantially centered in the lower surface of the wavelength conversion element 201. A strip-like heater 202 is formed in a region extending along the longitudinal direction of the waveguide 201a by interposing a SiO2 film or the like therebetween.

An indium oxide (ITO) film as a transparent conductive film is used to form the heater 202. By forming the heater 202 from a conductive film transparent to the light propagating through the optical waveguide 201a, if the heater 202 is exposed to an intense light beam such as laser light propagating through the optical waveguide 201a, the heater 202 can be prevented from being damaged by absorbing the light.

Instead of ITO, InTiO may be used as the transparent conductive film for forming the heater 202. The InTiO film is a film of indium oxide doped with Ti. In the case of an SHG wavelength conversion element that converts near-infrared light at a longer wavelength than 1.2 μm, for example, near-infrared light at 1.26 μm, into visible light of wavelength 0.63 μm, an ITO film may be used, but an InTiO film is preferred for use. The reason is that the InTiO film has a higher transmissivity and lower absorptivity than the ITO film in the longer wavelength region, while retaining about the same electrical conductivity as that of the ITO film.

Using the same material as that of the heater 202, a plurality of lead portions 205 for applying a voltage to the heater 202 are formed at predetermined spaced intervals for connection to the heater 202. The heater 202 is formed as a thin narrow strip to provide a high resistance necessary to function as a heater, while on the other hand, each lead portion 205 is formed thick so that its resistance becomes lower than that of the heater 202. At least three lead portions 205 are formed.

As shown at F in FIG. 15 (see FIG. 16 for details), the lead portion 205 is formed thin where it connects to the heater 202, and becomes thicker as the distance from the heater 202 increases. The reason is to maximize the high resistance region that functions as the heater 202. The heater 202 and the lead portions 205 can be formed simultaneously by patterning the transparent conductive film such as indium oxide (ITO).

In the wavelength conversion element 201, since the heater 202 for the waveguide 201a can be formed as a continuous single strip, eliminating the need to divide it into separate sections, the optical effects that the heater 202 will have on the waveguide 201a can be suppressed.

As shown in FIGS. 14 and 15, an Au film 223 is formed in such a manner as to overlap the lead portions 205 formed in the wavelength conversion element 201. The Au film 223 is a metallic film for bonding to the micro bumps 230 formed on the silicon substrate 207 as will be described later.

As shown in FIGS. 13, 14, and 17, an electrode pattern 206 is formed on the silicon substrate 207 in a position corresponding to the position of the Au film 223 formed on the wavelength conversion element 201. The micro bumps 230 for bonding to the Au film 223 of the wavelength conversion element 201 are formed on the electrode pattern 206. Further, terminals Ta and Tb for external electrical connections are formed in the electrode pattern 206. As shown in FIG. 13, and more precisely at E in FIG. 14, by bonding the Au film 223 of the wavelength conversion element 201 to the micro bumps 230 on the silicon substrate 207, the wavelength conversion element 201 is mechanically bonded to the silicon substrate 207. When the two members are thus bonded together, the terminals Ta and Tb are electrically connected to the heater 202 via the micro bumps 230, the Au film 223, and the lead portions 205, and in this condition, voltage can be applied to the heater 202 via the terminals Ta and Tb.

The optical device 200 shown in FIGS. 12 to 17 has been described by taking as an example the structure in which the heater 202 and the lead portions 205 are provided for the wavelength conversion element 201 having a proton-exchanged waveguide. However, the heater 202 and lead portions 205 such as shown in FIGS. 13 to 15 may be provided for the wavelength conversion element having a ridge-type waveguide.

Figure 18A:
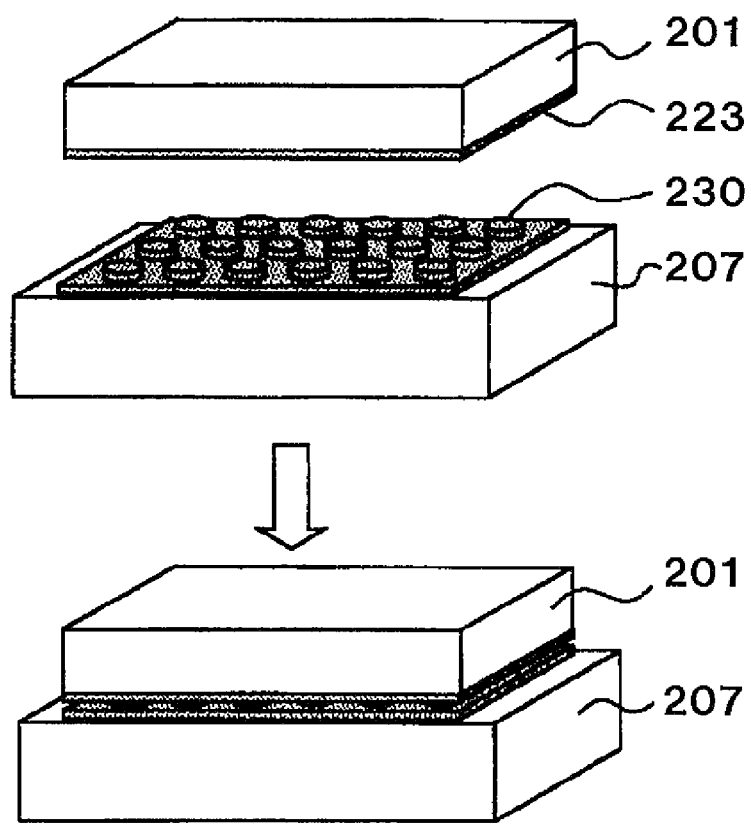
FIG. 18(a) is a perspective view for explaining how the silicon substrate 207 and the wavelength conversion element 201 are bonded together by micro bumps 330.
Figure 18B:
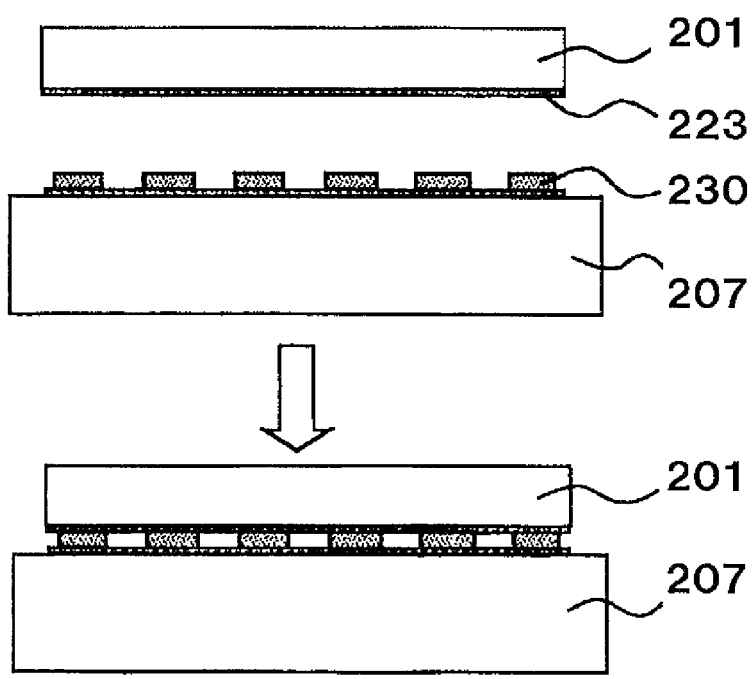
FIG. 18(b) is a side view for explaining how the silicon substrate 207 and the wavelength conversion element 201 are bonded together by the micro bumps 330.

FIG. 18 is a diagram for explaining the micro bump bonding. FIG. 18(a) is a perspective view for explaining how the silicon substrate 207 and the wavelength conversion element 201 are bonded together by the micro bumps 230, and FIG. 18(b) is a side view for explaining how the silicon substrate 207 and the wavelength conversion element 201 are bonded together by the micro bumps 230.

In FIGS. 18(a) and 18(b), a large number of cylindrically shaped micro bumps 230 of Au are formed on a thin Au film on the upper surface of the silicon substrate 207. On the other hand, the thin Au film 223 is formed on the lower surface of the wavelength conversion element 201, that is, the surface to be bonded to the silicon substrate 207. In this condition, when the wavelength conversion element 201 is placed on the silicon substrate 207 and pressed together without applying heat, the Au is activated and the wavelength conversion element 201 is bonded to the silicon substrate 207 at normal temperature (normal temperature activated bonding). The diameter of each micro bump 230 is about 5 µm, and the height is about 1 µm.

Since the bonding by the Au micro bumps does not require heating, the fabrication process can be simplified. Furthermore, since there is no concern that a misalignment may occur between the silicon substrate 207 and the wavelength conversion element 201 due to heating, the silicon substrate 207 and the wavelength conversion element 201 can be bonded together with high accuracy.

Figure 19:
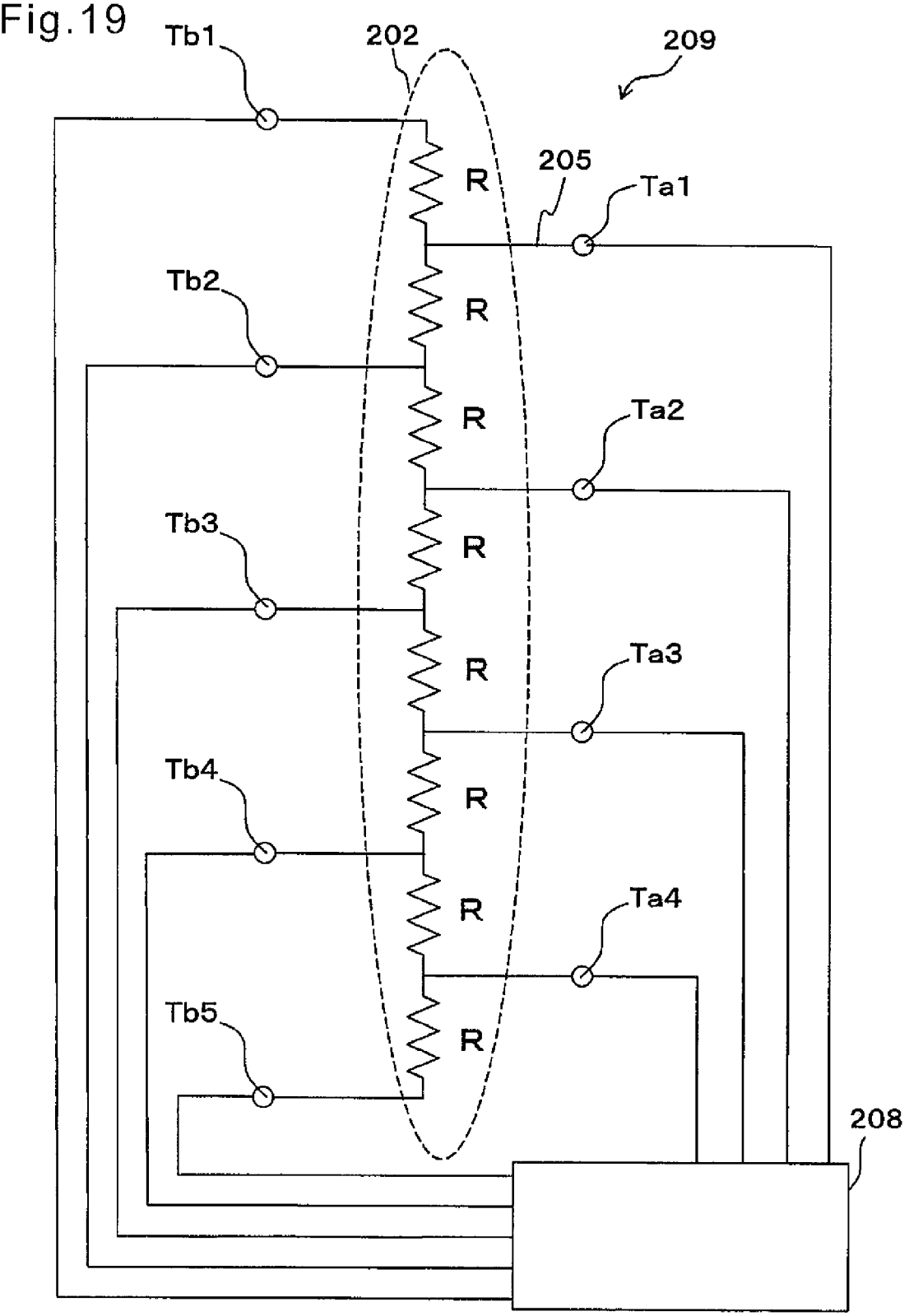
FIG. 19 is an explanatory diagram showing the configuration of a portion of an optical apparatus 209.

FIG. 19 is an explanatory diagram showing the configuration of a portion of an optical apparatus 209.

FIG. 19 shows an electrical equivalent circuit of the heater 202 of the wavelength conversion element 201 along with the lead portions 205 and the terminals Ta and Tb. The optical apparatus 209 includes, in addition to the optical device 200, a voltage applying means 208 for applying voltage to the terminals Ta and Tb.

As shown in FIG. 19, the heater 202 is divided into a number of areas of resistors R, the lead portions 205 are connected to both ends of each resistor R, and each lead portion 205 is connected at the other end to a corresponding one of the terminals Ta and Tb. By controlling the Joule heat generated due to the current flowing through each resistor R of the heater 202 by the voltage applied to each terminal Ta, Tb, it becomes possible to selectively control the temperature of the waveguide by the heater 202.

Figure 20:
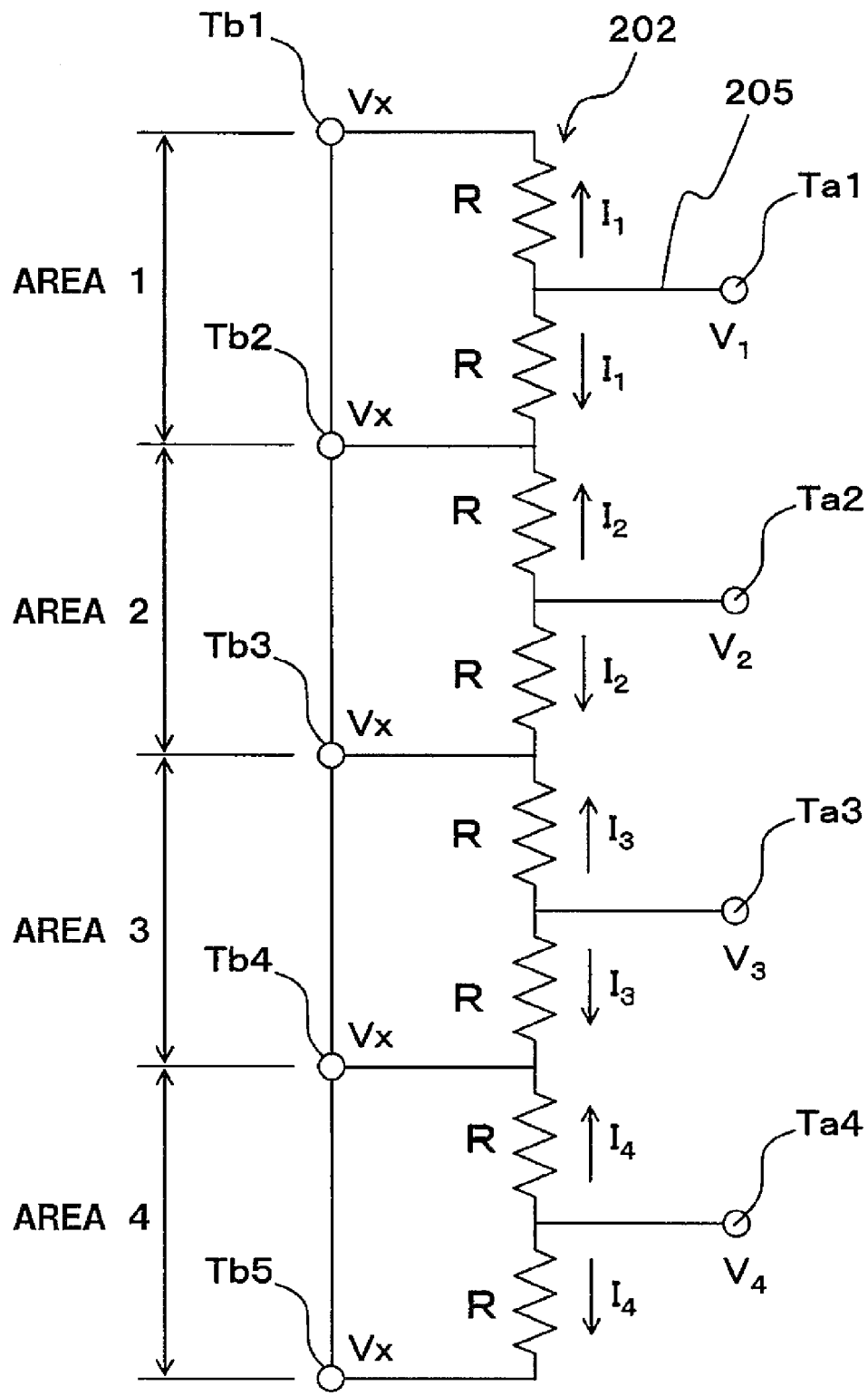
FIG. 20 is an explanatory diagram illustrating an example of how voltages are applied to terminals Ta and Tb.

FIG. 20 is an explanatory diagram illustrating an example of how voltages are applied to the respective terminals Ta and Tb.

As shown in FIG. 20, the same voltage Vx is applied to the terminals Tb1 to Tb5 4 located at alternate sites, and different voltages V1 to V4 are applied to the remaining terminals Ta1 to Ta4, respectively; with this arrangement, different currents I1 to I4 can be made to flow through the respective areas designated as AREAs 1 to 4 each made up of two resistors R. In this way, temperature control can be performed independently for each of the areas designated as AREAs 1 to 4.

Figure 21A:
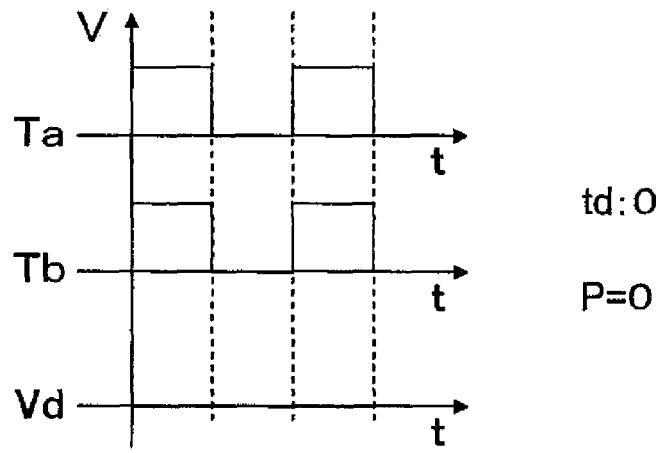
FIG. 21(a) is a diagram illustrating a control example when there is no phase difference between the voltage applied to the terminal Ta and the voltage applied to the terminal Tb.
Figure 21B:
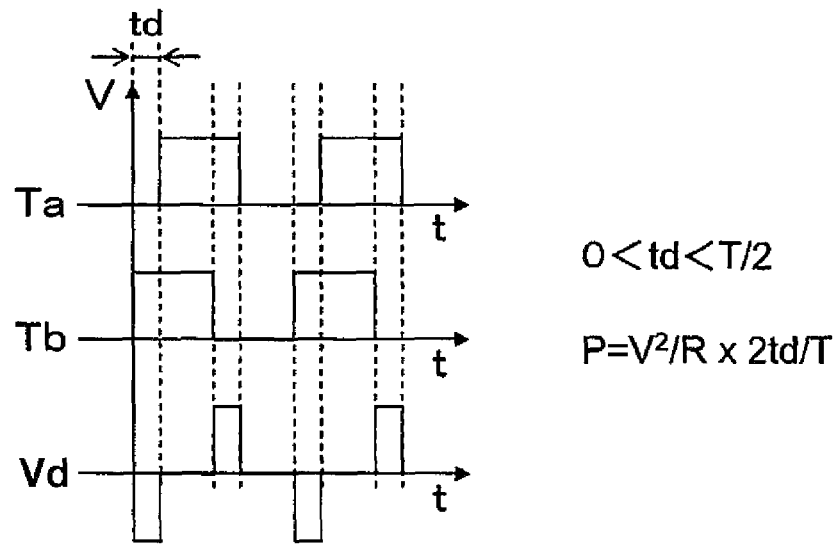
FIG. 21(b) is a diagram illustrating the case (1) when there is a phase difference between the voltage applied to the terminal Ta and the voltage applied to the terminal Tb.
Figure 21C:
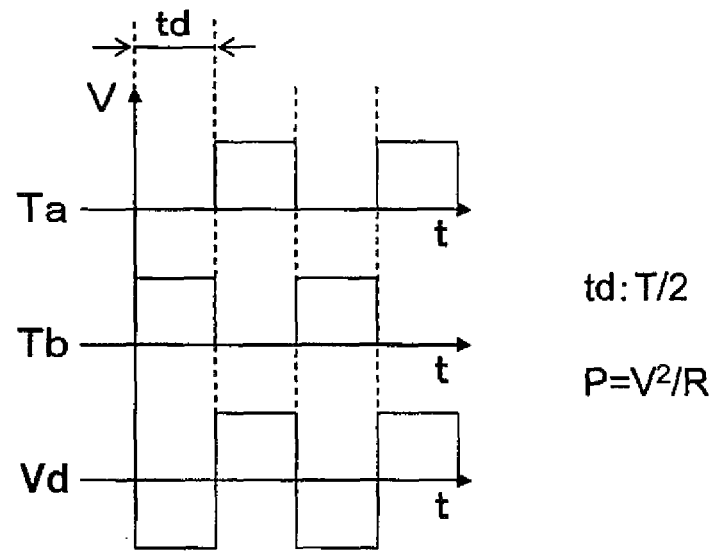
FIG. 21(c) is a diagram illustrating the case (2) when there is a phase difference between the voltage applied to the terminal Ta and the voltage applied to the terminal Tb.

FIG. 21 is an explanatory diagram illustrating examples of how the heater 202 is controlled by the voltage applying means 208. FIG. 21(a) is a diagram illustrating a control example when there is no phase difference between the voltage applied to the terminal Ta and the voltage applied to the terminal Tb, FIG. 21(b) is a diagram illustrating the case (1) when there is a phase difference between the voltage applied to the terminal Ta and the voltage applied to the terminal Tb, and FIG. 21(c) is a diagram illustrating the case (2) when there is a phase difference between the voltage applied to the terminal Ta and the voltage applied to the terminal Tb. Control zero shown in FIG. 21 is what is called the pulse width modulation control, and square wave voltages having the same amplitude and period are applied to the respective terminals Ta and Tb.

When there is no phase difference between the voltage applied to the terminal Ta and the voltage applied to the terminal Tb (that is, td=0), as shown in FIG. 21(a), no potential difference (Vd) develops across the resistor R of the heater 202, and no current flows through the resistor R; as a result, no thermal energy is generated. On the other hand, when the phase difference td between the voltage applied to the terminal Ta and the voltage applied to the terminal Tb is such that 0<td<T/2, as shown in FIG. 21(b), a current proportional to the potential difference (Vd) flows through the resistor R of the heater 202, generating thermal energy which is given as $P=V^2/R \times 2td/T$.

Further, when the phase difference td between the voltage applied to the terminal Ta and the voltage applied to the terminal Tb is td=T/2, the thermal energy that is generated when a current proportional to the potential difference (Vd) flows through the resistor R of the heater 202 is given as $P=V^2/R$ and thus reaches a maximum.

As shown in FIG. 21, the voltage applying means 208 employing a pulse width modulation control method applies a square wave to each control voltage terminal (in the example of FIG. 20, Ta) by shifting its phase with respect to the square wave applied to the common electrode (in the example of FIG. 20, Tb). With this method, compared with analog (peak value) control, precise temperature control comparable to multi-bit digital control, for example, with 10 or more bits, can be achieved using only simple digital circuitry.

The heater configuration and the heater control method employed for the optical device 200 and optical apparatus 209 shown in FIGS. 12 to 21 may be applied to any one of the previously described optical devices 1, 100, and 110. The optical apparatus constructed by adding the voltage applying means to the optical device may also be called the optical device.

Figure 22:
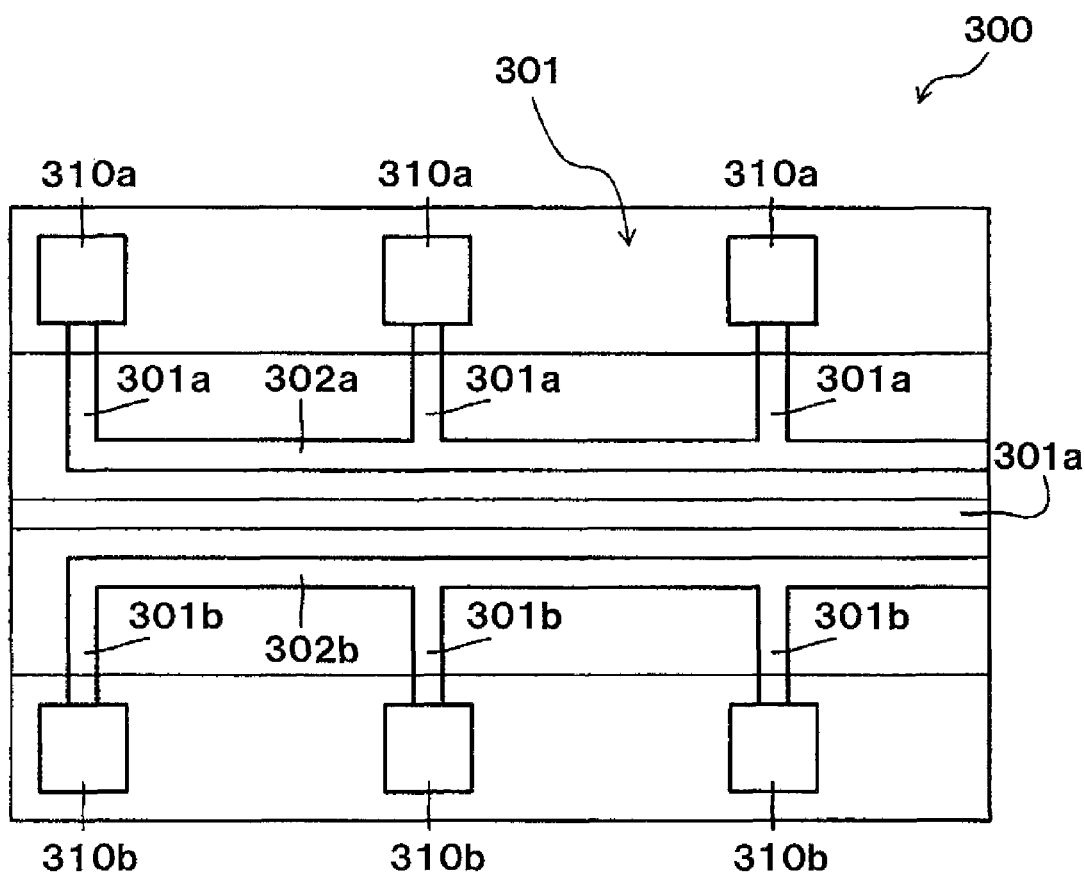
FIG. 22 is a plan view of a wavelength conversion element 301 incorporated in a yet further alternative optical device 300.
Figure 23:
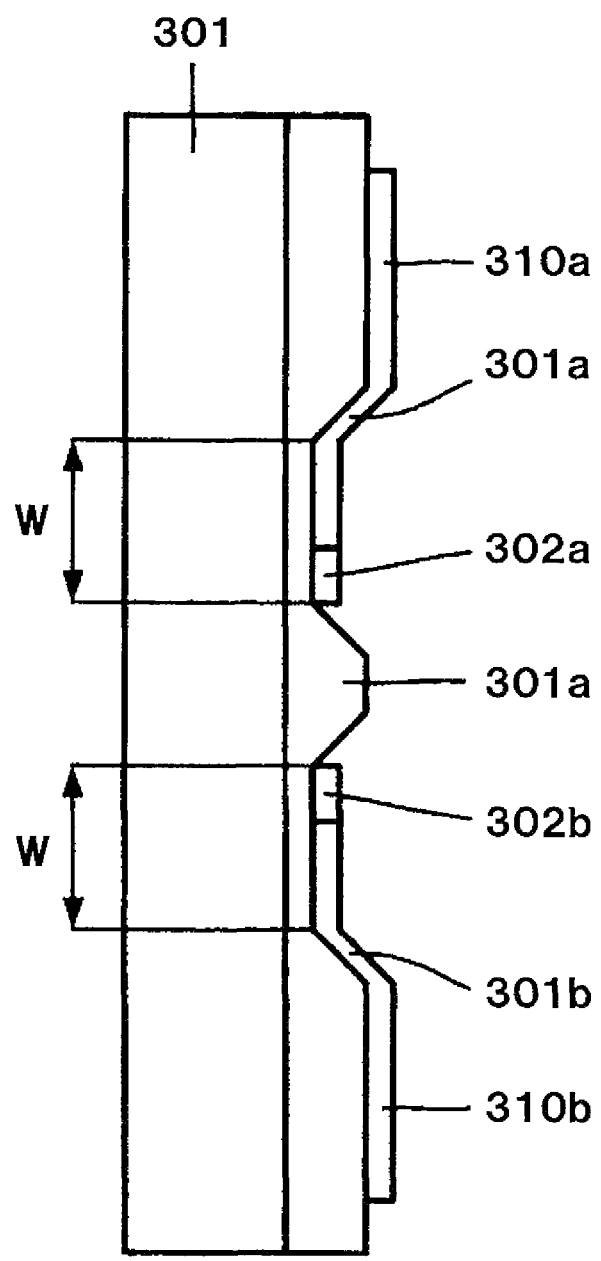
FIG. 23 is a cross-sectional view of the wavelength conversion element 301 shown in FIG. 22.

FIG. 22 is a plan view of a wavelength conversion element 301 incorporated in a yet further alternative optical device 300, and FIG. 23 is a cross-sectional view of the wavelength conversion element 301 shown in FIG. 22. In FIGS. 22 and 23, only a portion of the wavelength conversion element 301 of the optical device 300 is shown; otherwise, the configuration is the same as that of the earlier described optical device 200.

As shown in FIGS. 22 and 23, the wavelength conversion element 301 is provided with first electrodes 310a and second electrodes 310b formed from Au.

Lead portions 301a also formed from Au are brought out of the plurality of first electrodes 310a and extend towards a waveguide 301a. The end of each lead portion 301a is connected to a heater 302a formed from Au, the heater 302a extending parallel to the waveguide 301a. Similarly, lead portions 301b also formed from Au are brought out of the plurality of second electrodes 301b and extend towards the waveguide 301a. The end of each lead portion 301b is connected to a heater 302b formed from Au, the heater 302b also extending parallel to the waveguide 301a.

In the wavelength conversion element 301 of the optical device 300, the waveguide 301a is formed in a raised ridge portion. In the above configuration, since the lead portions 301a and 301b are formed so as to extend into the recessed portions on both sides of the ridge portion, the heaters 302a and 302b can be placed in close proximity to the waveguide 301a, and it thus becomes possible to directly heat the waveguide 301a with the heaters 302a and 302b. The waveguide 301a may be formed in some other suitable portion than the ridge portion.

In the wavelength conversion element 301 of the optical device 300, the first electrodes 310a, the second electrodes 310b, the lead portions 301a and 301b, and the heaters 302a and 302b are formed from the same material (for example, Au) on the wavelength conversion element 301. The first electrodes 310a and the second electrodes 310b are also used as metallic films for bonding to the micro bumps 230 formed on the silicon substrate 207 shown in FIG. 14. Since the first electrodes 310a, the second electrodes 310b, the lead portions 301a and 301b, and the heaters 302a and 302b are formed from the same material (for example, Au), these elements can be easily formed by patterning. Furthermore, since the heaters are formed from the same material as the electrodes (metallic films) to be bonded, there is no need to separately form the individual electrodes for the heaters 302a and 302b.

By adjusting the pattern size when forming the patterns on the wavelength conversion element 301, the resistance value suitable for pulse width modulation control, for example, 5 V, can be obtained. For example, when the heaters 302a and 302b are formed from a thin Au film with a length L=1 mm and a cross-sectional area A=2 μm×0.5 μm, then the heater resistance R is given as R=ρL/A=23.5Ω, and the Au resistivity as $\rho = 2.35 \times 10^{-8}$ Ωm, where $L = 1 \times 10^{-3}$ m and $A = 2 \times 0.5 \times 10^{-12}$ m$^2$. With this arrangement, when 5 V is applied as pulse width modulation, this gives 1.06 W for 235 mA, from which it is seen that the length W of each lead portion 301a, 301b should be chosen equal to about 2 mm.

Figure 24:
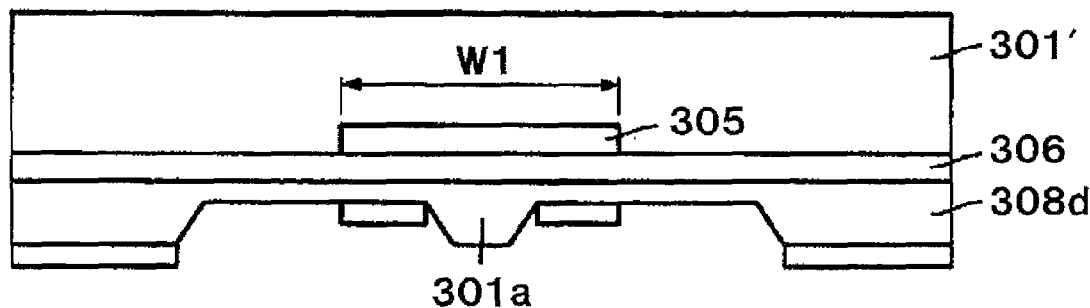
FIG. 24 is a diagram showing a modified example of the wavelength conversion element 301 depicted in FIG. 23.

FIG. 24 is a diagram showing a modified example of the wavelength conversion element 301 depicted in FIG. 23.

FIG. 24 shows a wavelength conversion element 301' as a modified example constructed by adding a polarization reversing electrode 305 to the wavelength conversion element 301 depicted in FIG. 23. As shown in FIG. 24, in the wavelength conversion element 301', the polarization reversing electrode 305 is formed, not across the entire width of the wavelength conversion element 301', but only in the portion (with a prescribed width W1) corresponding to the ridge portion of the waveguide 301a. The polarization reversing electrode 305 is formed from an ITO film. Further, in the wavelength conversion element 301', a first substrate 308c and a second substrate 308d, which together form the wavelength conversion element 301', are bonded together by an adhesive layer 306. By interposing the adhesive layer 306 between the waveguide 301a and the electrode 305, it becomes possible to reduce the thermal conduction in the portion where the polarization reversing electrode 305 of the ITO film is formed.

Figure 25A:
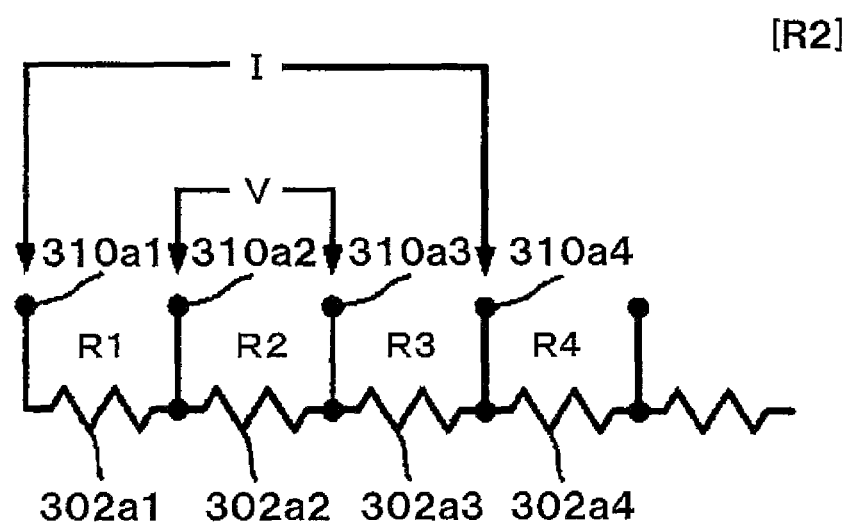
FIG. 25(a) is a diagram for explaining a method for detecting a voltage applied to a heater.
Figure 25B:
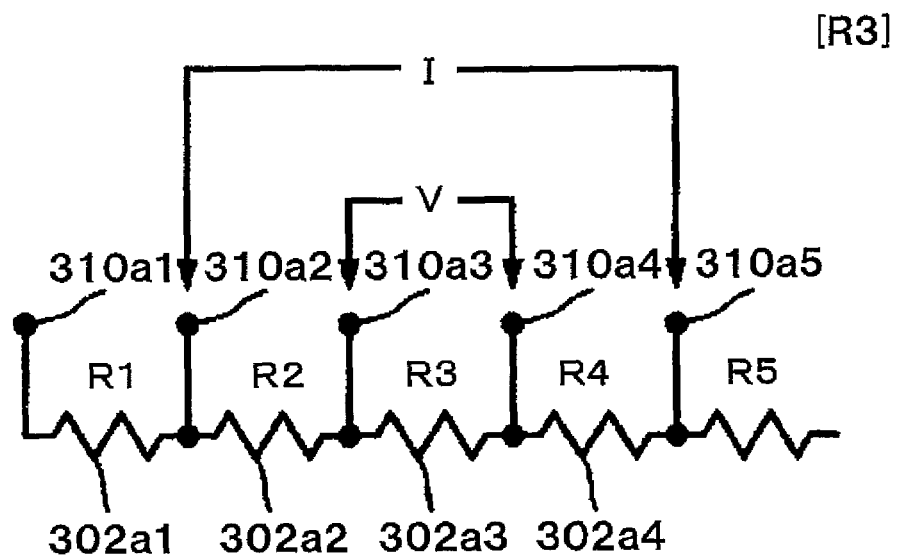
FIG. 25(b) is a diagram for explaining another method for detecting a voltage applied to a heater.
Figure 26A:
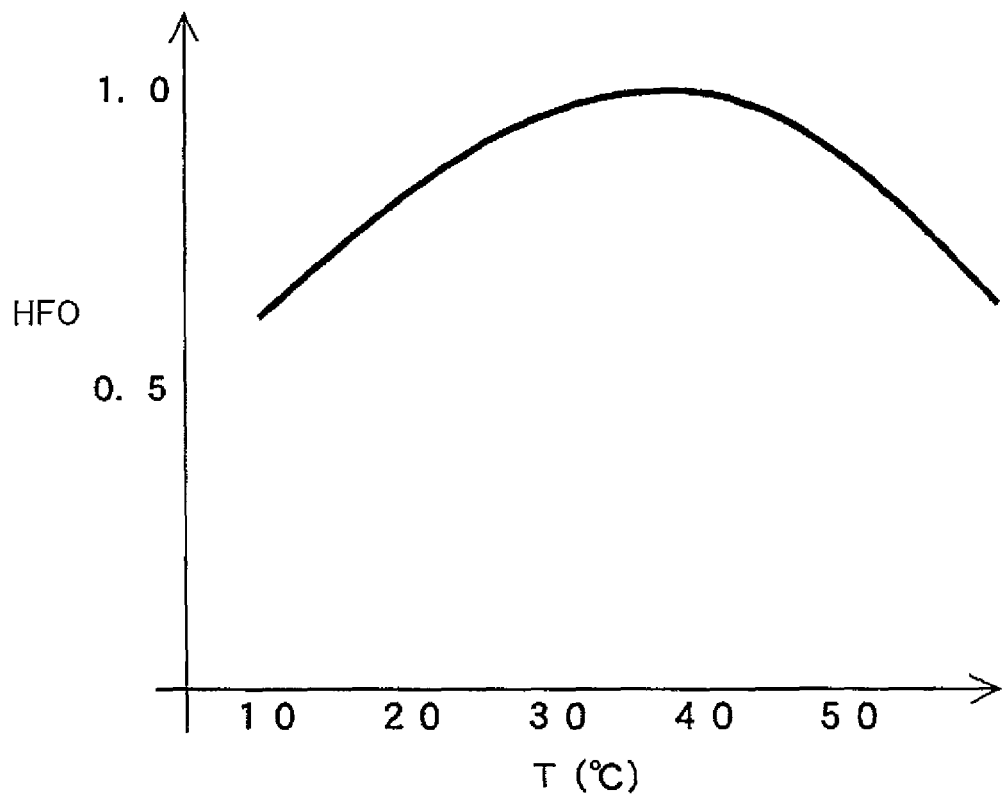
FIG. 26(a) is a graph showing one example of the variation of the harmonic output (HFO) of a wavelength conversion element as a function of the ambient temperature (T) of the wavelength conversion element.
Figure 26B:
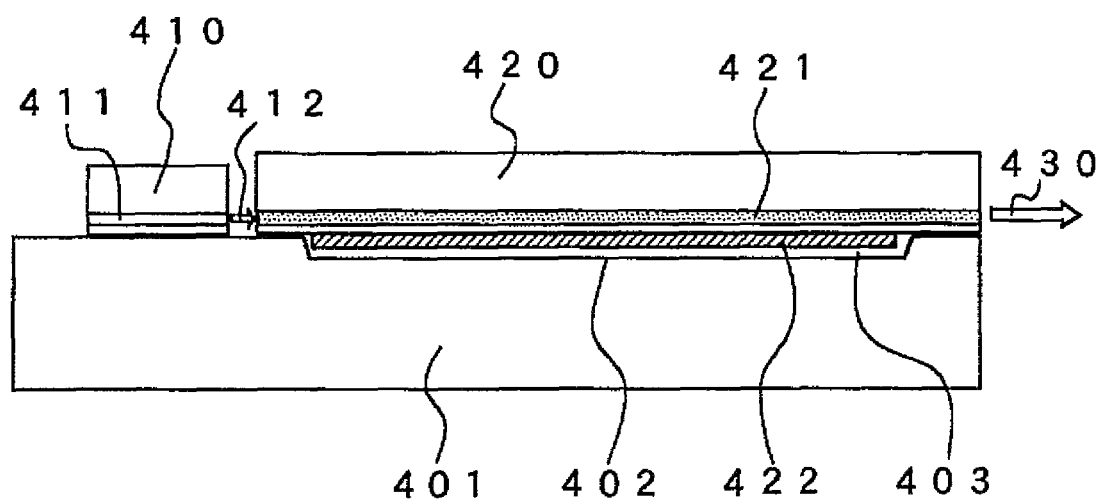
FIG. 26(b) is a diagram showing a short-wavelength laser light source disclosed in patent document 1.

FIG. 25(a) is a diagram for explaining a method for detecting a voltage applied to a heater, and FIG. 25(b) is a diagram for explaining another method for detecting a voltage applied to a heater.

Block-by-block temperature control can be performed using the plurality of first electrodes 310a and second electrodes 310b shown in FIG. 22. In this case, the voltage applied across each pair of electrodes can be detected accurately by a conventional four-terminal method such as shown in FIG. 25. The following description is given by taking the plurality of first electrodes 310a as an example.

FIG. 25(a) shows the case when detecting the voltage applied to the heater 302a2 (R2). In this case, current I is supplied from the electrodes 310a1 and 310a4 located on both sides of the pair of electrodes 310a2 and 310a3, and the voltage V developed across the pair of electrodes 310a2 and 310a3 of the heater 302a2 is detected.

FIG. 25(b) shows the case when detecting the voltage applied to the heater 302a3 (R3). In this case, current I is supplied from the electrodes 310a2 and 310a5 located on both sides of the pair of electrodes 310a3 and 310a4, and the voltage V developed across the pair of electrodes 310a3 and 310a4 of the heater 302a3 is detected.

The heater configuration and the heater control method employed for the optical device 300 and the modified example of the optical device 300 shown in FIGS. 22 to 25 may be applied to any one of the previously described optical devices 1, 100, and 110. The optical apparatus constructed by adding the voltage applying means to the optical device may also be called the optical device.

What is claimed is:

1. An optical device comprising:
   a substrate;
   an optical element with an optical waveguide formed in a surface thereof that faces said substrate;
   bonding portions formed on said substrate at positions that oppose each other across said optical waveguide, said bonding portions including a micro bump structure formed from metallic protrusions, each with a height of 1 to 5 μm and with a diameter of 2 to 10 μm, that are arranged substantially two-dimensionally in each of said bonding portions at a pitch of 5 to 30 μm;
   a heater, formed on at least one of said optical element and said substrate, for heating said optical waveguide; and
   wherein said optical element is bonded to said bonding portions via said micro bump structure by surface activated bonding, so that an air layer surrounding three sides of said optical waveguide is formed between said optical waveguide and said substrate, and
   numerous interstices which connect said air layer to the outside and do not allow foreign matters larger than said pitch of protrusions to pass through are formed by said micro bump structure between said substrate and said optical element.

2. The optical device according to claim 1, wherein said heater is formed on the surface of said optical element that faces said substrate.

3. The optical device according to claim 1, wherein said micro bump structure is made of Au and formed on said bonding portions, and said optical element includes an Au film for bonding to said micro bump structure.

4. The optical device according to claim 1, wherein said heater is formed from an ITO film or an InTiO film.

5. The optical device according to claim 1, wherein said heater is formed in the shape of a strip extending along a longitudinal direction of said optical waveguide, and said optical device further includes lead portions provided at predetermined spaced intervals along the longitudinal direction of said heater in order to apply a voltage to said heater.

6. The optical device according to claim 5, wherein each of said lead portions has a connecting portion whose width increases with increasing distance from said heater.

7. The optical device according to claim 6, further comprising voltage applying means for applying a voltage according to a pulse width modulation method to said lead portions.

8. The optical device according to claim 1, wherein said substrate is a silicon substrate and said optical element is a wavelength conversion element, further comprising a semiconductor laser for introducing laser light into said wavelength conversion element.

* * * * *